United States Patent
Qu et al.

(10) Patent No.: US 9,936,349 B2
(45) Date of Patent: *Apr. 3, 2018

(54) REDUCING SIGNALING LOAD CAUSED BY CHANGE OF TERMINAL LOCATION

(71) Applicant: TELEFONAKTIEBOLAGET LM ERICSSON (PUBL), Stockholm (SE)

(72) Inventors: Zhiwei Qu, Shanghai (CN); Kimi Jiao, Shanghai (CN); Jia Wang, Shanghai (CN); Lu Wang, Shanghai (CN); Pengyu Xu, Shanghai (CN); Fei Zeng, Shanghai (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/387,765

(22) Filed: Dec. 22, 2016

(65) Prior Publication Data

US 2017/0105093 A1  Apr. 13, 2017

Related U.S. Application Data

(63) Continuation of application No. 14/414,330, filed as application No. PCT/CN2012/078420 on Jul. 10, 2012, now Pat. No. 9,544,865.

(51) Int. Cl.
*H04W 4/08* (2009.01)
*H04W 4/02* (2018.01)
(Continued)

(52) U.S. Cl.
CPC ....... *H04W 4/021* (2013.01); *H04W 28/0226* (2013.01); *H04W 88/16* (2013.01)

(58) Field of Classification Search
CPC ....... H04W 64/00; H04W 4/02; H04W 4/021; H04W 4/022; H04W 4/023; H04W 4/025
(Continued)

(56) References Cited

U.S. PATENT DOCUMENTS 6,347,224 B1 * 2/2002 Smyth .................. H04M 15/00
                                                        379/112.01
8,041,335 B2  10/2011 Khetawat et al.
(Continued)

FOREIGN PATENT DOCUMENTS

CN          101409901 A        4/2009
CN          101568061 A       10/2009
(Continued)

OTHER PUBLICATIONS

Alcatel-Lucent, "Reducing the load due the User Location Reporting to a PCRF or to an OCS", 3GPP Draft; S2-120594-CR-23203-ULI-V0.2, 3rd Generation Partnership Project (3GPP), Mobile Competence Centre: 650, Route Des Lucioles; F-06921 Sophia-Antipolis Cedex; France, vol. SA WG2, no. Vancouver, Canada; Feb. 6, 2012, 12 pages.
(Continued)

*Primary Examiner* — Siu Lee
(74) *Attorney, Agent, or Firm* — Rothwell, Figg, Ernst & Manbeck, P.C.

(57) ABSTRACT

A mobility management node and a method in a mobility management node for reducing signalling caused by changes of location of a radio terminal, which mobility management node is configured to be operatively comprised by a wireless communication system and to operatively manage the mobility of the radio terminal and to operatively communicate with a gateway node acting as an interface between the system and an external network. The method comprises obtaining initial position information; obtaining boundary information indicating a boundary area wherein at least one of a policy or a charging rule is to be applied for the radio terminal; obtaining current position information; determining whether the radio terminal is inside or outside the boundary area; providing mobility information when the radio terminal is outside the boundary area and not provid-
(Continued)

ing mobility information to the gateway node when the radio terminal is inside the boundary area.

16 Claims, 9 Drawing Sheets

(51) Int. Cl.
*H04W 28/02* (2009.01)
*H04W 88/16* (2009.01)

(58) Field of Classification Search
USPC .... 455/456.1, 456.2, 456.3, 456.5, 457, 458
See application file for complete search history.

(56) References Cited

U.S. PATENT DOCUMENTS

| | | | |
|---|---|---|---|
| 9,544,865 B2* | 1/2017 | Qu | H04W 4/02 |
| 2001/0027104 A1 | 10/2001 | Hameleers et al. | |
| 2002/0191250 A1 | 12/2002 | Graves et al. | |
| 2007/0064684 A1 | 3/2007 | Kottilingal | |
| 2008/0076386 A1 | 3/2008 | Khetawat et al. | |
| 2010/0182960 A1* | 7/2010 | Valko | H04W 8/08 |
| | | | 370/329 |
| 2011/0177831 A1* | 7/2011 | Huang | G06F 17/3087 |
| | | | 455/457 |
| 2012/0009938 A1 | 1/2012 | Liu et al. | |
| 2012/0028626 A1* | 2/2012 | Marocchi | H04L 63/104 |
| | | | 455/422.1 |
| 2012/0064878 A1 | 3/2012 | Castro Castro | |
| 2012/0157113 A1 | 6/2012 | Brisebois et al. | |
| 2012/0276900 A1 | 11/2012 | Stephens et al. | |
| 2013/0055301 A1 | 2/2013 | Hao et al. | |
| 2013/0084864 A1 | 4/2013 | Agrawal et al. | |
| 2013/0217376 A1* | 8/2013 | Behairy | H04L 67/303 |
| | | | 455/418 |
| 2015/0148073 A1 | 5/2015 | Qu et al. | |

FOREIGN PATENT DOCUMENTS

| | | |
|---|---|---|
| CN | 101969600 A | 2/2011 |
| CN | 102457938 A | 5/2012 |
| EP | 2613597 A1 | 7/2013 |
| WO | 2008018150 A1 | 2/2008 |
| WO | 2011085973 A1 | 7/2011 |

OTHER PUBLICATIONS

Supplementary Search Report issued in EP 12 88 0912 dated Feb. 26, 2016, 8 pages.
3GPP "General Packet Radio Service (GPRS) enhancements for Evolved Universal Terrestrial Radio Access Network (E-UTRAN) access (Release 11)", 3GPP TS 23.401 V11.2.0, Jun. 2012(Jun. 2012), the whole document, 285 pages.
Network Working Group "Network Mobility (NEMO) Basic Support Protocol", Request for Comments: 3963, Jan. 2005(Jan. 2005), the whole document, 34 pages.
Non-final Office Action dated Feb. 25, 2016, issued in U.S. Appl. No. 14/409,569, 21 pages.
Extended European Search Report issued in related EP Application No. 12881026.4, dated Feb. 9, 2016, 12 pages.
Alcatel-Lucent: "Reducing the load due the User Location Reporting to a PCRF or to an OCS", 3GPP Draft; S2-120594, SA WG2 Meeting #89, Feb. 2012, 12 pages.
"3rd Generation Partnership Project; Technical Specification Group Services and System Aspects; General Packet Radio Service (GPRS) enhancements for Evolved Universal Terrestrial Radio Access Network (E-UTRAN) access (Release 10)", TS 23.401, V10.8.0, Jun. 2012, 278 pages.
"3rd Generation Partnership Project; Technical Specification Group Services and System Aspects; Study on Core Network Overload Solutions; (Release 12)", TR 23.843, SA WG2, V0.7.0, Nov. 2012, 32 pages.
Ericsson: "Presence Reporting Areas for Charging", 3GPP Draft; S5-144117, SA WG5, Aug. 2014, 17 pages.
3GPP, 3rd Generation Partnership Project; Technical Specification Group Services and System Aspects; General Packet Radio Service (GPRS) enhancements for Evolved Universal Terrestrial Radio Access Network (E-UTRAN) access (Release 12), 3GPP TS 23.401, V12.6.0, 2014, 306 pages.
3GPP, 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12), 3GPP TS 29.274, V12.6.0, 2014, 313 pages.
Final Office dated Sep. 9, 2016, issued in U.S. Appl. No. 14/409,569, 25 pages.

* cited by examiner

REDUCING SIGNALING LOAD CAUSED BY CHANGE OF TERMINAL LOCATION

CROSS REFERENCE TO RELATED APPLICATION(S)

This application is a continuation of U.S. application Ser. No. 14/414,330, filed Jan. 12, 2015, which is a 35 U.S.C. § 371 National Phase Entry Application from PCT/CN2012/078420, filed Jul. 10, 2012, designating the United States, the disclosure of which is incorporated herein in its entirety by reference.

TECHNICAL FIELD

Exemplifying embodiments presented herein are directed towards a mobility management node, and corresponding method therein, for reducing signaling caused by changes in location of a radio terminal served by the node.

BACKGROUND

Radio terminals in a wireless communications network communicate with one or more core networks via a Radio Access Network (RAN). The radio terminals may e.g. be mobile stations or user equipment units such as mobile telephones also known as "cellular" telephones, and laptops with wireless capability, e.g., mobile terminals, and thus can be, for example, portable, pocket, hand-held, computer-comprised, or car-mounted mobile devices which communicate voice and/or data with radio access network.

A radio access network covers a geographical area which is divided into cell areas, with each cell area being served by a radio access node, e.g. a Radio Base Station (RBS). In some radio access networks the radio access node may e.g. be called "NodeB" or "B node" or enhanced NodeB (eNB). A cell is a geographical area where radio coverage is provided by the equipment of a radio access node at a radio access node site. Each cell is identified by an identity, which may be broadcasted by the radio access node in within the local cell area. The radio access nodes communicate via an air interface with the radio terminals within range of the radio access nodes.

In some radio access network, several radio access nodes are connected, e.g. by landlines or microwave links, to a Radio Network Controller (RNC) or a Base Station Controller (BSC) or similar, which supervises and coordinates various activities of the plural base stations connected thereto. A RNC or a BSC or similar are typically connected to one or more core networks.

For example, the Universal Mobile Telecommunications System (UMTS) is a third generation wireless communication system, which evolved from the Global System for Mobile Communications (GSM), and is intended to provide improved mobile communication services based on Wideband Code Division Multiple Access (WCDMA) technology. UMTS Terrestrial Radio Access Network (UTRAN) is essentially a radio access network using wideband code division multiple access for user equipment units (UEs). The Third Generation Partnership Project (3GPP) has undertaken to evolve further the UTRAN and GSM based radio access network technologies. Long Term Evolution (LTE) together with Evolved Packet Core (EPC) is the newest addition to the 3GPP family.

In modern wireless communication systems there are typically Service Aware Charging and Control (SACC) components like an Online Charging System (OCS) and/or a Policy and Charging Rules Function (PCRF) that requires information about the location of the radio terminals in the system. The main purpose is to enable a differentiation of charging and policy depending on the location of a radio terminal.

For example, in LTE the PDN Gateway (PGW) reports changes in location of a radio terminal to the PCRF. In turn, the PDN Gateway (PGW) may request the Mobility Management Entity (MME) to report changes in location of a radio terminal, e.g. by report changes of ECGI/TAI by independently using the "MS Info Change Reporting Action" parameter for any or each Packet Data Network (PDN) connection of a User Equipment (UE) and/or to report changes of user CSG information by using the "CSG Information Reporting Action" parameter.

However, this causes a heavy signalling load from the MME via the Serving Gateway (SGW) to the PGW, and from the PGW to the PCRF. Due to the increased signalling load it is recommended that a report of change in location is only applied for a limited number of radio terminals. However, even if a change in location is only reported for a limited number of terminals, the signalling load may still be too heavy.

SUMMARY

In view of the above it seems that changes in location of radio terminals served by a wireless communication system causes heavy signalling load between nodes in the wireless communication system. Thus there seems to be a need for reducing such signalling load.

Embodiments of the present solution make location change simple and effective based on the notion that a gateway node—e.g. comprising a Policy and Charging Enforcement Function (PCEF)—and/or a SACC component can indicate a boundary of location that is of interested for a radio terminal. The serving node and/or the gateway node will not report any new locations to the gateway node or the SACC component respectively until the radio terminal moves out of the location area, whereupon a relevant SACC component or similar may apply a new charging rule or QoS policy or similar for the radio terminal in question.

At least some drawbacks indicated above have been eliminated or at least mitigated by an embodiment of the present solution directed to a method in a mobility management node for reducing signalling caused by changes of location of a radio terminal, which mobility management node is configured to be operatively comprised by a wireless communication system and to operatively manage the mobility of the radio terminal and to operatively communicate with a gateway node acting as an interface between the system and an external network. The method comprises the actions of: obtaining initial position information indicating an initial position for the radio terminal; obtaining boundary information based on the initial position information, which boundary information indicates a boundary area wherein at least one of a policy or a charging rule is to be applied for the radio terminal; obtaining current position information indicating the current position of the radio terminal; determining whether the radio terminal is inside or outside the boundary area based on the boundary information and the position information; providing mobility information, indicating the current position of the radio terminal, to the gateway node when the radio terminal is outside the boundary area and not providing mobility information to the gateway node when the radio terminal is inside the boundary area.

At least some drawbacks indicated above have been eliminated or at least mitigated by an embodiment of the present solution directed to a mobility management node configured to be operatively comprised by a wireless communication system, and to operatively manage the mobility of a radio terminal, and to operatively communicate with a gateway node acting as an interface between the system and an external network. The mobility management node is further configured to operatively: obtain initial position information indicating an initial position for the radio terminal; obtain boundary information based on the initial position information, which boundary information indicates a boundary area wherein at least one of a policy or a charging rule is to be applied for the radio terminal; obtain current position information indicating the current position of the radio terminal; determine whether the radio terminal is inside or outside the boundary area based on the boundary information and the position information; provide mobility information, indicating the current position of the radio terminal, to the gateway node when the radio terminal is outside the boundary area, and not provide mobility information to the gateway node when the radio terminal is inside the boundary area to reduce signalling caused by changes of location of the radio terminal.

BRIEF DESCRIPTION OF THE DRAWINGS

The foregoing will be apparent from the following more particular description of exemplifying embodiments, as illustrated in the accompanying drawings in which like reference characters refer to the same parts throughout the different views. The drawings are not necessarily to scale, emphasis instead being placed upon illustrating the exemplifying embodiments.

DETAILED DESCRIPTION

In the following description, for purposes of explanation and not limitation, specific details are set forth, such as particular components, elements, techniques, etc. in order to provide a thorough understanding of some exemplifying embodiments of the present solution. However, it will be apparent to those skilled in the art that the exemplifying embodiments may be practiced in other manners that depart from these specific details. In other instances, detailed descriptions of well-known methods and elements are omitted so as not to obscure the description of the exemplifying embodiments. The terminology used herein is for the purpose of describing the exemplifying embodiments and is not intended to limit the embodiments presented herein.

Exemplifying Wireless Communications Systems

The attention is now directed to the features of some exemplifying wireless communication systems wherein some embodiments of the present solution may be executed.

Figure 1:
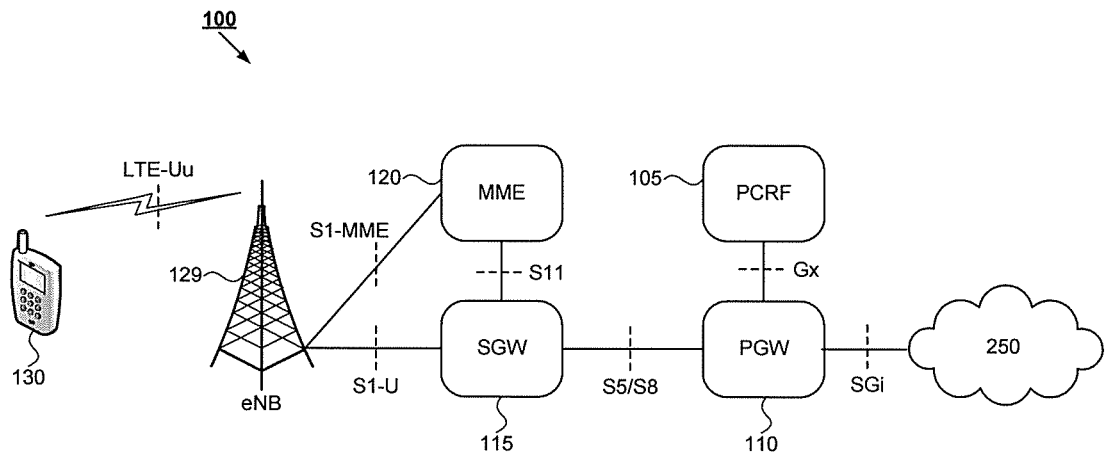
FIG. 1 is a schematic illustration of an exemplifying wireless communication system 100 wherein at least some embodiments of the present solution can be implemented.

FIG. 1 shows a schematic overview of an exemplifying wireless communication system 100 in which some exemplifying embodiments presented herein may be utilised. The exemplifying system 100 is a so called LTE based system. It should be pointed out that the terms "LTE" and "LTE based" system is here used to comprise both present and future LTE based systems, such as, for example, advanced LTE systems.

It should be appreciated that although FIG. 1 shows a LTE based system, the example embodiments herein may also be utilised in other wireless communication systems comprising nodes and functions that correspond to the nodes and functions of the system 100.

System 100 may accommodate a plurality of various radio terminals, e.g. in the form of a plurality of user equipments or similar. FIG. 1 shows one User Equipment (UE) 130 as an example. The radio terminals of system 100 or similar are configured to operatively communicate with one or several radio access nodes (e.g. an eNodeB) of the system 100 using an air interface (e.g. an LTE-Uu) to access resources provided by the system 100. A skilled person having the benefit of this disclosure realizes that vast number of well known radio terminals may be used in connection with various embodiments of the present solution. The radio terminal may e.g. be a cell phone device or similar, e.g. such as a Mobile Station (MS) or similar, e.g. defined by the standards provided by the 3GPP. The basic structure and functions of various radio terminals such are well known as such to those skilled in the art and the basic structure and function of the radio terminals needs no detailed description as such. However, it should be emphasized that a radio terminal may be embedded (e.g. as a card or a circuit arrangement or similar) in and/or attached to various other devices, e.g. such as various laptop computers or tablets or similar or other mobile consumer electronics or similar, or vehicles or boats or air planes or other movable devices, e.g. intended for transport purposes. Indeed, the radio terminal may even be embedded in and/or attached to various stationary or semi-stationary devices, e.g. domestic appliances such as refrigerators or blenders or other kitchen appliances or similar, or consumer electronics such as printers or television sets or similar.

Traffic between the user equipment 130 and the core network of the exemplifying system 100 is routed via a radio access node, e.g. a base station, which, depending on the nature of the system, has different names. In a LTE based system, such as the system 100, the radio access node may be referred to as an eNodeB 129 (eNB) or similar. The system 100 may comprise and/or be connected to a plurality of various radio access nodes, even other radio base stations that are not eNodeB.

The mobility of the user equipment 130 is controlled by what may be generically referred to as a mobility management node. A mobility management node or similar is preferably configured to operatively control the mobility of the radio terminals of the system when moving between radio access nodes similar. This may e.g. include supervision and control of a handover of the radio terminal between two radio access nodes. The mobility management node may be a core network node in a core network of a wireless communication system or similar. The specific mobility management node in the exemplifying system 100 is a Mobility Management Entity (MME) 120. The core network of the system 100 may comprise the MME 120, a Serving Gateway (SGW) 115, a PDN Gateway (PGW) 110 and a Policy and Charging Rules Function (PCRF). The basic structure and functions of various mobility management nodes such as the MME 120 are well known per se to those skilled in the art and the basic structure and function of the MME 120 need no detailed description as such.

In addition, system 100 also accommodates a Serving Gateway (SGW) 115 or similar. It preferred that the SGW 115 or similar of system 100 or similar is configured to operatively act as an interface between the internal IP network of system 100 (mainly the core network) and the radio access network or similar (e.g. including eNodeBs etc as described above) of system 100 or similar. It is preferred that the SGW 115 or similar is configured to operatively handle user plane data or similar payload data flowing between one or more radio terminals or similar—e.g. the user equipment 130 or similar—and the PGW 110. This may e.g. include at least one of: tunneling of user plane data, establishing, modifying and/or releasing bearers etc for the user equipment 130 or similar.

Moreover, system 100 also accommodates a PDN Gateway (PGW) 110 or similar. It preferred that the PGW 110 is configured to operatively act as an interface between the internal IP network of the system 100 (mainly the core network) and external IP networks 250. This may e.g. include at least one of: allocation and/or reservation of IP addresses to user radio terminals currently registered in the system 100. This may also include that the PGW 110 or similar comprises a Policy and Charging Enforcement Function (PCEF) enforcing rules and/or policies or similar received from the PCRF 105 or a similar SACC component, and/or that the PGW is configured to act as a DHCP relay agent, comprising firewall functions and/or proxy functions and/or packet inspection functions etc. It may be added that the PGW 110 may be arranged to take certain policy and charging actions on its own without the use of a PCRF or similar.

In addition, system 100 also accommodates a Policy and Charging Rules Function (PCRF) 105 or similar SACC component. It is preferred that the PCRF 105 or similar SACC component of system 100 is configured to operatively determine policy rules—preferably in real-time—with respect to the radio terminals of the system 100 or similar. This may e.g. include at least one of: aggregating information to and from the core network and/or operational support systems of system 100 or similar so as to support the creation of rules and/or automatically making policy decisions for user radio terminals currently active in the system 100 based on such rules or similar. It is preferred that the PCRF 105 or similar is configured to provide the PGW 110 or similar with such rules and/or policies or similar to be used by the PGW 110 or similar acting as a PCEF or similar.

The eNodeB 129 of system 100 is connected to the SGW 115, e.g. via a S1-U interface, and preferably also to the MME 120, e.g. via a S1-MME interface. Similarly, the MME 120 and the SGW 115 are connected, e.g. via an S11 interface. In turn, the SGW 115 is connected to the PGW 110, e.g. via a S5 and/or S8 interface, and the PGW 110 is connected to the PCRF 105, e.g. via a Gx interface. The interfaces S1-MME, S1-U, S11, S5/S8, Gx and SGi shown in FIG. 1 are all well known to those skilled in the art. Moreover, these interfaces and similar are thoroughly defined in the 3GPP specifications and they need no detailed description as such.

Figure 2:
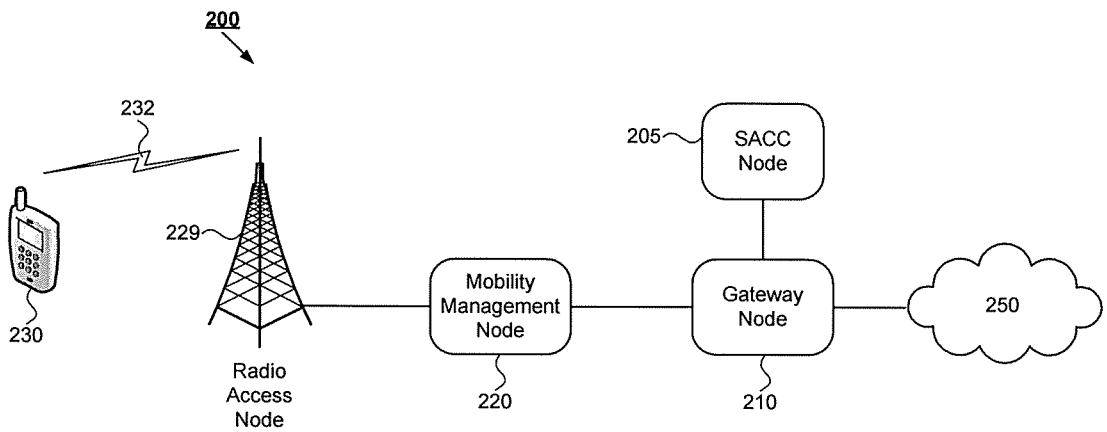
FIG. 2 is a schematic illustration of a more generalised exemplifying wireless communication system 200 wherein at least some embodiments of the present solution can be implemented.

FIG. 2 shows a schematic overview of an exemplifying wireless communication system 200, which may be regarded as a generalisation of the exemplifying wireless communication system 100 shown in FIG. 1. System 200, in which the exemplifying embodiments presented herein may be utilised, comprises one or more radio access nodes 229, at least one mobility management node 220, at least one gateway node 210 and at least one Service Aware Charging and Control (SACC) component node.

Before proceeding it should be emphasised that embodiments of the solution—including the embodiments presented herein—may be implemented in other wireless communication systems than systems 100 and 200 discussed herein.

The exemplifying radio access nodes 229 may be any suitable radio access node that is configured to route traffic between one or more radio terminals 230 and the core network of system 200. The radio access node may e.g. be a base station, e.g. an eNodeB 129 or similar as in system 100.

The exemplifying radio terminal 230 may be any suitable radio terminal configured to operatively communicate with the radio access node 229 via an air interface 232. The radio terminal 230 may e.g. be a User Equipment or a Mobile Equipment or a Mobile Station or similar as described above with reference to system 100.

The mobility management node 220 may be any network node that is configured to operatively manage mobility of the radio terminal 230, e.g. configured to manage handover operations or similar for the radio terminal 230 served by the radio access node 229. The mobility management node 220 may e.g. be a core network node, e.g. a MME 120 or similar as described above with reference to system 100, or a Radio Access Network (RAN) node, e.g. such as a Base Station Controller (BSC) or a Radio Network Controller (RNC) or similar.

The gateway node 210 may be any suitable gateway node configured to operatively act as an interface between the internal IP network of the system 200—mainly the core network, at least comprising the gateway node 210 and the SACC node 205—and external IP networks 250. The gateway node 210 may e.g. be a Gateway GPRS Support Node (GGSN) or similar, or a PGW 110 or similar as described above with reference to system 100.

In addition, the SACC node 205 may be any suitable node that comprises a SACC function or similar. The SACC node 205 may e.g. be configured to operatively provide an Online Charging System (OCS) and/or a Policy and Charging Rules Function (PCRF), configured to enable a differentiation of the charging and/or policy depending on the location of a radio terminal 230.

Figure 3:
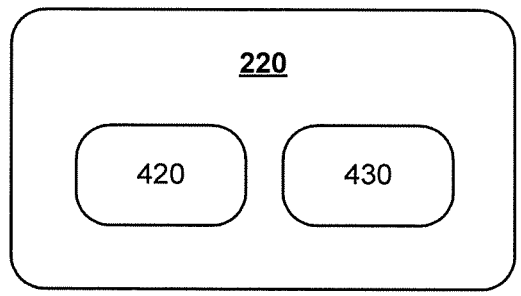
FIG. 3 is a schematic illustration of a mobility management node according to at least some of the embodiments of the present solution.

FIG. 3 shows some interior parts of the mobility management node 220 being relevant to the example embodiments described herein. As can be seen, the mobility management node 220 may comprise processing circuitry 420 and a memory unit 430. The processing circuitry 420 may e.g. comprise signal processing circuitry and/or logic circuitry and/or interfacing circuitry as required by the embodiments described herein. In particular embodiments, some or all of the functionality described herein as being provided by a mobility management node or similar may be provided by the processing circuitry 420, e.g. executing instructions stored on a computer-readable medium, such as the memory unit 430 shown in FIG. 3. Alternative embodiments of the mobility management node 220 may comprise additional components responsible for providing additional functionality, comprising any of the functionality identified herein and/or any functionality necessary to support the example embodiments described herein.

Operation of Exemplifying Communications Systems

The attention is now directed to the operation of wireless communication systems wherein some embodiments of the present solution may be executed.

Figure 4A:
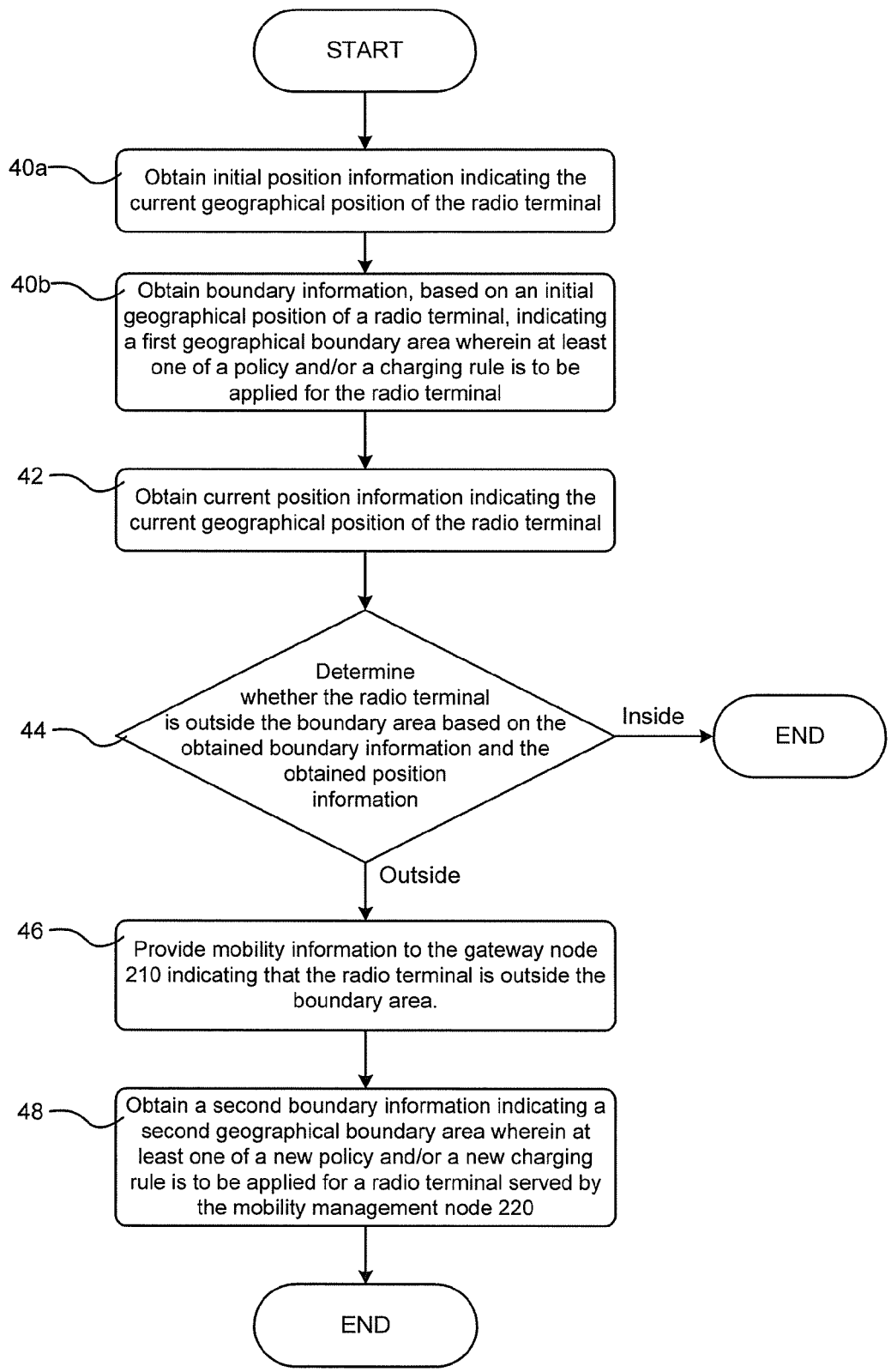
FIG. 4a is a flow diagram illustrating exemplifying operations that may be executed by at least some embodiments of the present solution.

FIG. 4a illustrates a flow diagram depicting exemplifying operations which may be performed by the mobility management node 120 and 220 of FIG. 1 and FIG. 2 respectively so as to provide a reduced signalling load between the core nodes of the wireless communication system 100 or 200 respectively, which signalling load is caused by a change in location of the radio terminals served by the system.

Example Operation 40a:

The mobility management node 220 may be configured to operatively obtain initial position information indicating an initial geographical position of the radio terminal 230.

The initial geographical position is not necessarily the first position that the radio terminal has ever had. Rather, the initial geographical position is the position held by the radio terminal 230 when operation 40b starts, meaning that the radio terminal 230 may or may not have held other positions before operation 40b starts.

The initial position information indicating the initial geographical position of the radio terminal may be any information from which the mobility management node 220 can construe the initial position of the radio terminal 230. The information may e.g. represent the initial geographical coordinates of the radio terminal 230, e.g. originally obtained by means of a GPS-function in the radio terminal 230 and/or by means of a triangulation function implemented in one or several nodes of the system 200 utilising a plurality of radio access nodes 229 that receive radio signals from the terminal 230. Additionally or alternatively, the initial geographical position may e.g. be represented by the identity of a TA and/or a LA and/or RA or a similar area, or even by the identity of a PLMN, or by the identity of one or several RAN nodes, e.g. the identity of one or several radio access nodes, e.g. such as the radio access node 229 or similar, or one or several cells served by such a radio access node.

The mobility management node 220 may be configured to obtain the initial position information—indicating an initial geographical position of the radio terminal 230—by requesting and/or receiving such information from the radio terminal 230 and/or from a RAN node or similar currently serving the radio terminal 230, e.g. such as the radio access node 229. Additionally or alternatively the mobility management node 220 may be configured to obtain the initial position information by requesting and/or receiving such information from one or more core network nodes of a wireless communication system in which the mobility management node operates, e.g. one or more core network nodes of system 200 or similar. The request and/or reception may be performed via one or more other nodes or similar of the system 200.

Example Operation 40b:

The mobility management node 220 may be configured to operatively obtain boundary information based on the initial geographical position of the radio terminal 230, which boundary information indicates a geographical boundary area wherein a policy and/or a charging rule or similar is to be operatively applied for the radio terminal 230.

The mobility management node 220 may obtain the boundary information by requesting and/or receiving boundary information from a node of the system 200, e.g. from a node in the core network of the system 200, e.g. from the gateway node 210 and/or from the SACC node 205 or similar. The request and/or reception may be performed via one or more other nodes or similar of the system 200. For example, the request and/or reception may pass one or more other nodes before arriving at the target. Additionally or alternatively, the mobility management node 220 may obtain boundary information in that the boundary information is pre-configured in the mobility management node 220. For example, the boundary information may have been previously requested and/or received from a node in system 200, e.g. from a node in the core network of system 200. The mobility management node 220 may initiate an obtaining of boundary information, e.g. by providing the geographical position of the radio terminal 230 in a request sent to a node in the core network of the system 200, e.g. to the gateway node 210 and/or the SACC node 205 or similar. In addition or alternatively, the gateway node 210 and/or the SACC node 205 may initiate the obtaining of boundary information, e.g. by sending a request to the mobility management node 220. The request may be performed via one or more other nodes or similar of the system 200, e.g. the request may pass one or more other nodes before arriving at the mobility management node 220.

A geographical boundary area may e.g. be defined by one or more Tracking Areas (TA) and/or Location Areas (LA) and/or Routing Areas (RA) or similar areas, or even a by a Public Land Mobile Network (PLMN) or similar. Note that a TA, a LA and a RA or similar area may comprise one or several RAN nodes. Indeed the geographical area may correspond to the coverage of one or several RAN nodes, e.g. the coverage of the cell or cells served by one or several radio access nodes, e.g. such as the radio access node 229 or similar.

Figure 4B:
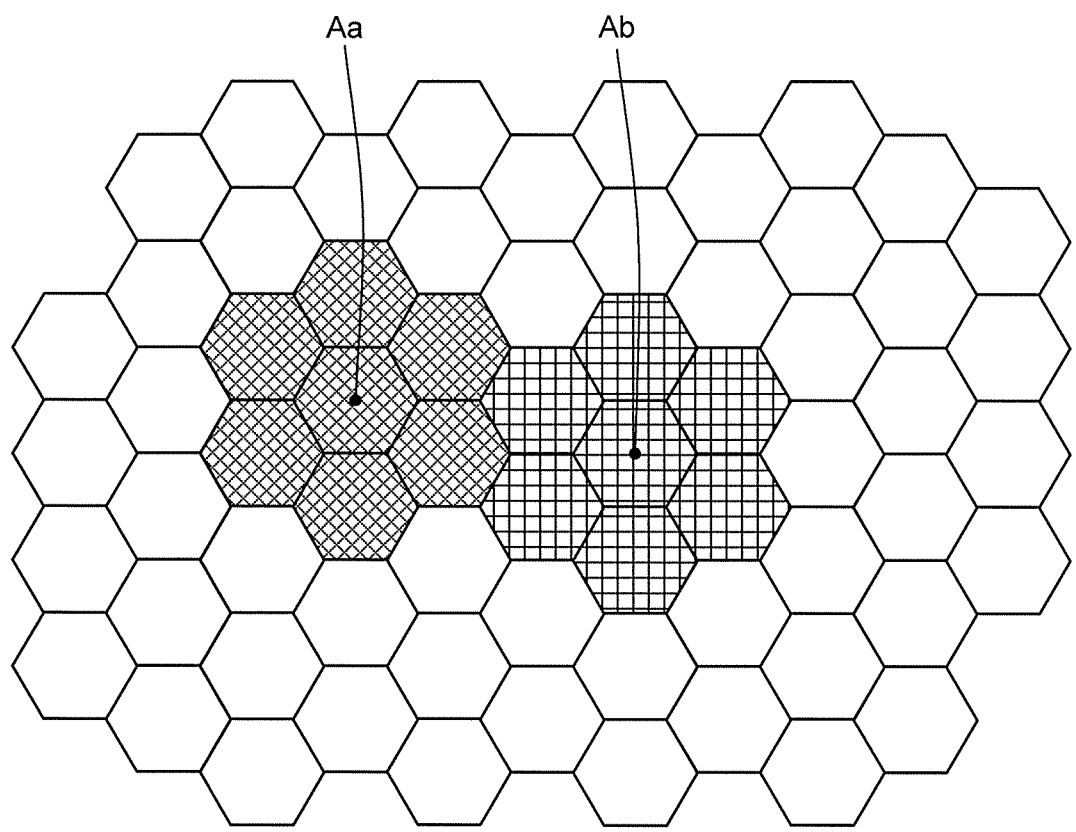
FIG. 4b illustrates a first exemplifying boundary area Aa and a second exemplifying boundary area Ab each defined by a separate sub-set of tracking areas in a set of tracking areas served by the system 200.

FIG. 4b illustrates a first exemplifying boundary area Aa (see the hexagons with horizontal stripes) comprising a first sub-set of Tracking Areas (TAs) in a set of TAs served by the system 200, and a second exemplifying boundary area Ab (see the hexagons with vertical stripes) comprising a second sub-set of TAs in the set of TAs served by the system 200. Here, it is assumed that the first boundary area and the second boundary area are adjacent to each other. Other boundary areas may neither be adjacent to the first boundary area Aa nor to the second boundary area Ab but they may still be relevant for the present solution.

A policy for a radio terminal may e.g. indicate one or more services or similar that the radio terminal is allowed to access and/or use, and/or the conditions or similar under which such services can be accessed and/or used. This may e.g. include an indication of the level of service and/or the Quality of Service (QoS) or similar to be provided for one or more services used by the radio terminal in question. Additionally or alternatively a policy may indicate a routing scheme and/or a security scheme or similar to be applied with respect to the radio terminal in question, e.g. in terms of encoding schemes and/or firewall functions and/or packet filtering functions or similar to be applied with respect to the terminal. Said one or more services may be provided by the core network or via the core network of the system 200. The character and/or function of various policies are well known to those skilled in the art and they need no detailed description as such.

A charging rule may e.g. indicate features to be applied with respect to billing schemes or similar for the radio terminal in question. The billing schemes or similar relate to the usage of services accessed and/or used by the radio terminal 230. The character and/or function of various charging rules are well known to those skilled in the art and they need no detailed description as such.

Some embodiments of the present solution may define and/or store all or parts of the policy and/or charging rules or similar for a radio terminal in a subscriber database or similar. The subscriber database may be provided by a node in or a function in the core network of the system 200. The subscriber database may e.g. be provided by a SACC node, e.g. by a Home Subscriber Server (HSS) or similar. The policy and/or charging rules elaborated herein may at least partly be the same or similar as those used in connection with LTE based systems or similar defined in the 3GPP specifications.

Example Operation 42:

The mobility management node 220 may be configured to operatively obtain position information indicating the current geographical position of the radio terminal 230.

The position information indicating of the current geographical position of the radio terminal may be any information from which the mobility management node 220 may deduce the current geographical position of the radio terminal 230. The information may e.g. represent the current geographical coordinates of the radio terminal 230, e.g. originally obtained by means of a GPS-function in the radio terminal 230 and/or by means of a triangulation function implemented in one or several nodes of the system 200, e.g. utilising a plurality of radio access nodes 229 that receive radio signals from the terminal 230. Additionally or alternatively, the current geographical position may be represented by the same or similar information that may represent the geographical boundary area. In other words the current position may e.g. be represented by the identity of a TA and/or a LA and/or RA or a similar area, or even by the identity of a PLMN, or by the identity of one or several RAN nodes, e.g. the identity of one or several radio access nodes, e.g. such as the radio access node 229 or similar, or one or several cells served by such a radio access node.

The mobility management node 220 may be configured to obtain the position information indicating a current geographical position of the radio terminal 230 by requesting and/or receiving such information from the radio terminal 230 and/or from a RAN node or similar currently serving the radio terminal 230, e.g. such as the radio access node 229. Additionally or alternatively the mobility management node 220 may be configured to obtain the position information indicating the current geographical position of the radio terminal 230 by requesting and/or receiving such information from one or more core network nodes of a wireless communication system in which the mobility management node operates, e.g. one or more core network nodes in the system 200 or similar. The request and/or reception may be performed via one or more other nodes or similar of the system 200.

Example Operation 44:

The mobility management node 220 may be configured to operatively determine whether the radio terminal 230 is currently outside the geographical boundary area, based on the boundary information obtained in operation 40 and based on the position information obtained in operation 42. If the radio terminal 230 is outside the boundary area then the execution will proceed to operation 46 wherein the current position is reported as will be described below. However, if the radio terminal 230 is still inside the boundary area then the execution is ended and the current geographical position of the radio terminal 230 is not reported according to operation 46, which will reduce the overall signaling load in the core network of system 200.

For example, the mobility management node 220 may determine that the radio terminal 230 is currently outside the boundary area by comparing the boundary information with the position information. For example, it can be determined that the radio terminal 230 is outside the boundary area when the position information indicates a current geographical position for the radio terminal 230 that is outside or at least substantially outside the geographical boundary area indicated by the boundary information.

For example, if the boundary information and the position information indicate the same TA, or LA or RA or similar then the boundary area and the current geographical position coincide and the radio terminal is within the boundary area. However, if the boundary information and the position information indicate different TAs, or Las or RAs or similar then the radio terminal is outside the boundary area. In another example, if the if the boundary information indicates a TA, LA or RA or similar whereas the position information indicates a cell that is outside the TA, LA or RA in question then the radio terminal is outside the boundary area. In still another example, if the if the boundary information indicates a PLMN or similar whereas the position information indicates a TA, LA, RA or a cell or similar that is outside the coverage of that PLMN then the radio terminal is outside the boundary area.

Example Operation 46:

The mobility management node 220 may be configured to operatively provide mobility information to the gateway node 210 indicating that the radio terminal 230 is outside the boundary area.

The mobility information may e.g. indicate the current position of the radio terminal 230. Additionally or alternatively, the mobility information may simply indicate that the radio terminal 320 has a current position that differs from a previous position, i.e. indicate that the position of the radio terminal 230 has changed. Here the gateway node 210 may request further information indicating the current position of the radio terminal from the mobility management node 220, which in turn may reply by sending such information to the gateway node 210.

The mobility management node 220 may be configured to provide mobility information—indicating the current geographical position of the radio terminal 230—by sending such information to the gateway node 210, e.g. by sending a message comprising the mobility information to the gateway node 210. The information may be sent via one or more other nodes or similar of the system 200.

As already indicated when discussing operation 44 above it is preferred that the mobility management node 220 is configured to operatively provide mobility information to the gateway node 210 area only when it is detected that the radio terminal 230 is outside the geographical boundary area. Thus, no mobility information is sent from the mobility management node 220 to the gateway node 210 while the radio terminal 230 changes its position within the boundary area. This has the advantage of reducing the signaling load between the mobility management node 220 and the gateway node 210 since no mobility information is provided unless the radio terminal 230 appears outside the boundary area. As an additional effect the signaling load between the gateway node 210 and the SACC node 205 of system 200 is also reduced since the gateway node 210 will not report any changed position for the radio terminal 230 until the gateway node 210 receives mobility information from the mobility management node 220 as indicated above. Thus, the total signaling load within system 200 is significantly reduced.

Example Operation 48:

The mobility management node 220 may be configured to operatively obtain another boundary information indicating another boundary area wherein another policy and/or another charging rule is to be operatively applied for the radio terminal 230. Obtaining another boundary information is a result of the fact that the position of the radio terminal 230 is outside the first boundary area indicated by the first boundary information obtained in operation 40b discussed above and thus a new policy and/or charging rule is to be operatively applied for the radio terminal 230.

The mobility management node 220 may obtain the second boundary information in the same or similar manner as the first boundary information is obtained in operation 40b discussed above, e.g. by requesting and/or receiving the boundary information from the gateway node 210 and/or the SACC node 205 or similar of the system 200.

Figure 5:
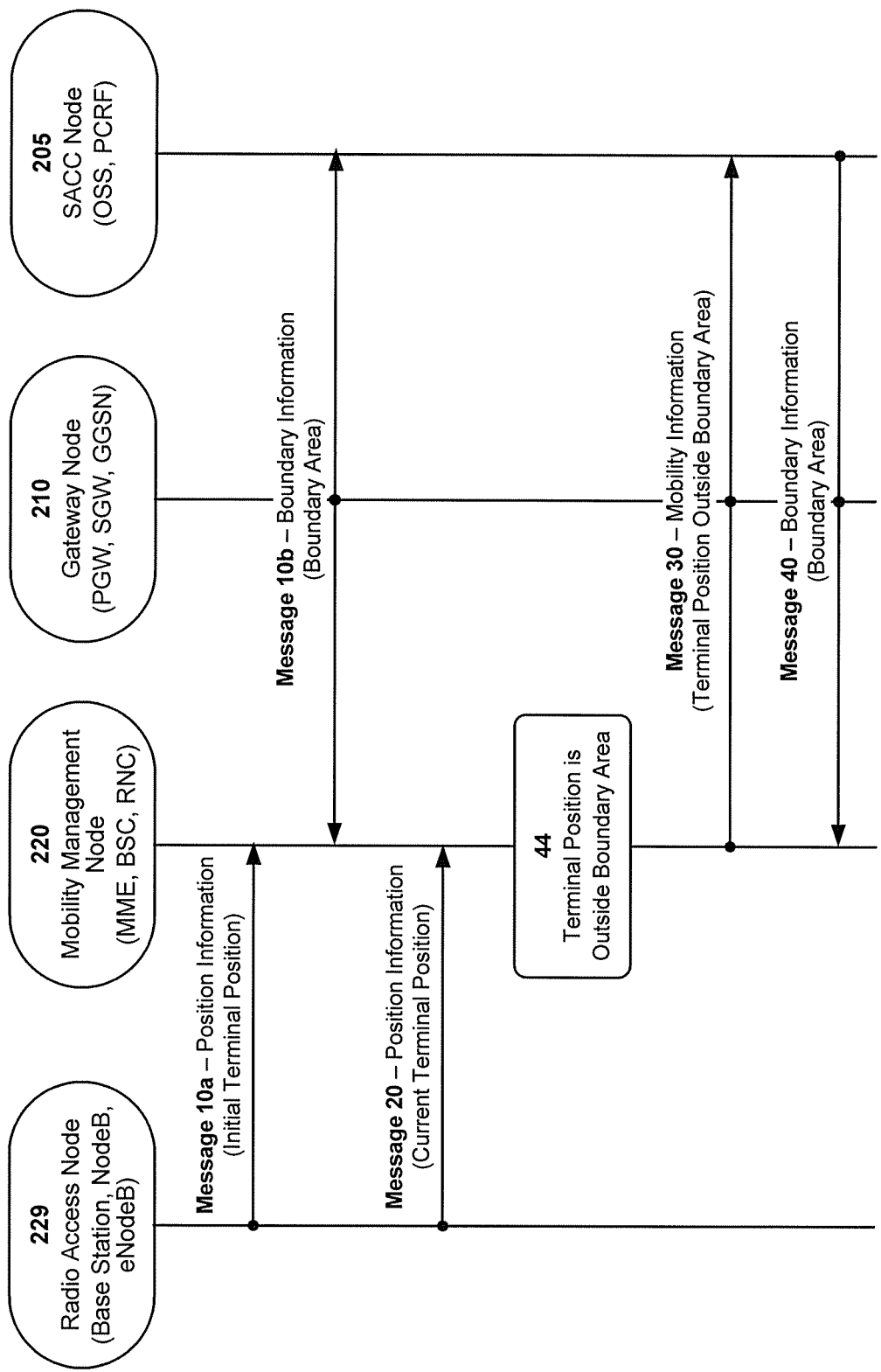
FIG. 5 is a signaling diagram illustrating exemplifying messages that may be exchanged between nodes in a wireless communication system configured to implement at least some embodiments of the present solution.

FIG. 5 is a signaling diagram illustrating some exemplifying messages that may be transmitted and/or received by nodes implementing at least some embodiments of the present solution.

FIG. 5 shows a radio access node 229, a mobility management node 220, a gateway node 210 and a SACC node 205 as previously discussed above with reference to system 200 shown in FIG. 2. As indicated when discussing system 200, the radio access node 229 may e.g. be a base station, e.g. such as a NodeB or an eNodeB or similar, and the mobility management node 220 may be a MME or a BSC or a RNC or similar, and the gateway node 210 may e.g. be a PGW or a GGSN and in some cases even a SGW, and the SACC node 205 may e.g. be an OSS or a PCRF or similar.

The signalling diagram of FIG. 5 illustrates various action performed by the nodes 220, 210, 205 and messages sent between the nodes 220, 210, 205 as will be elaborated in some detail below. However, it should be appreciated that the messages and actions elaborated below are a non-limiting examples. Some embodiments of the present solution may comprise additional messages and some other embodiments may not use all the messages indicated below. Some other embodiments may perform the messages in a different order compared to the one given in FIG. 5.

Message 10a:

The mobility management node 220 may be configured to operatively receive position information in a message 10a sent from the radio access node 229. The reception may be performed via one or more other nodes or similar of the system 200. The radio access node 229 may have initiated this message. Alternatively, the mobility management node 220 may have initiated this message by requesting the position information from the radio access node 229, which in turn may reply by sending such information to the mobility management node 220.

Message 10a is one way of performing operation 40a discussed above with reference to FIG. 4a.

Message 10b:

The mobility management node 220 may be configured to operatively receive boundary information in a message 10b sent from the gateway node 210 to the mobility management node 220. The reception of the boundary information in the mobility management node 220 may be performed via one or more other nodes or similar of the system 200. For example, the gateway node 210 may have received the boundary information or similar in a message sent from the SACC node 205 before the gateway node 210 sends the boundary information to the mobility management node 220. The SACC node 205 and/or the gateway node 210 may have initiated this message. Alternatively, the mobility management node 220 may have initiated this message, e.g. by requesting boundary information from the gateway node 210 and/or the SACC node 205, which in turn may reply by sending such information to the mobility management node 220.

Message 10b is one way of performing operation 40b discussed above with reference to FIG. 4a.

Message 20:

The mobility management node 220 may be configured to operatively receive position information in a message 20 sent from the radio access node 229. The reception may be performed via one or more other nodes or similar of the system 200. The radio access node 229 may have initiated this message. Alternatively, the mobility management node 220 may have initiated this message, e.g. by requesting the position information from the radio access node 229, which in turn may reply by sending such information to the mobility management node 220.

Message 20 is one way of performing operation 42 discussed above with reference to FIG. 4a.

Message 30:

Here it is assumed that operation 44 has been performed, as discussed above with reference to FIG. 4. Thus, here it may be assumed that the mobility management node 220 has determined that that radio terminal 230 is outside the boundary area based on the boundary information obtained in message 10b and based on the position information obtained in message 20 as described above.

When it is determined that that radio terminal 230 is outside the boundary area then the mobility management node 220 may be configured to operatively send a message 30 comprising mobility information to the gateway node 210, where the mobility information indicates that the radio terminal 230 is outside the boundary area. The mobility information may e.g. indicate the current position of the radio terminal 230 and/or indicate that the radio terminal 320 has a current position that differs from a previous position, i.e. indicate that the position of the radio terminal 230 has changed.

In turn, the gateway node 210 may send the mobility information in a message to the SACC node 205.

Message 30 is one way of performing operation 46 discussed above with reference to FIG. 4a.

Message 40:

The mobility management node 220 may be configured to operatively obtain another boundary information as discussed above in connection with operation 48 in FIG. 4a.

The mobility management node 220 may obtain the other boundary information in the same or similar manner as describe above when discussing message 10b.

Message 40 is one way of performing operation 48 discussed above with reference to FIG. 4a.

The attention is now directed to a number of exemplifying embodiments that will be described with reference to an LTE based system such as system 100 discussed above with reference to FIG. 1. The embodiments relates i.a. to the specifications 3GPP TS 23.401 and/or 3GPP TS 29.274.

Before proceeding it should be emphasised that some embodiments of the present solution—not limited to embodiments implemented in system 100—may utilise Boundary Information that comprises a list of Tracking Area Identifiers (TAIs) and/or Routing Area Identifiers (RAIs) and/or a list of Cell Global Identifiers (CGIs) and/or Service Area Identifiers (SAIs) and/or EUTRAN Cell Global Identifiers (ECGIs).

Figure 6A:
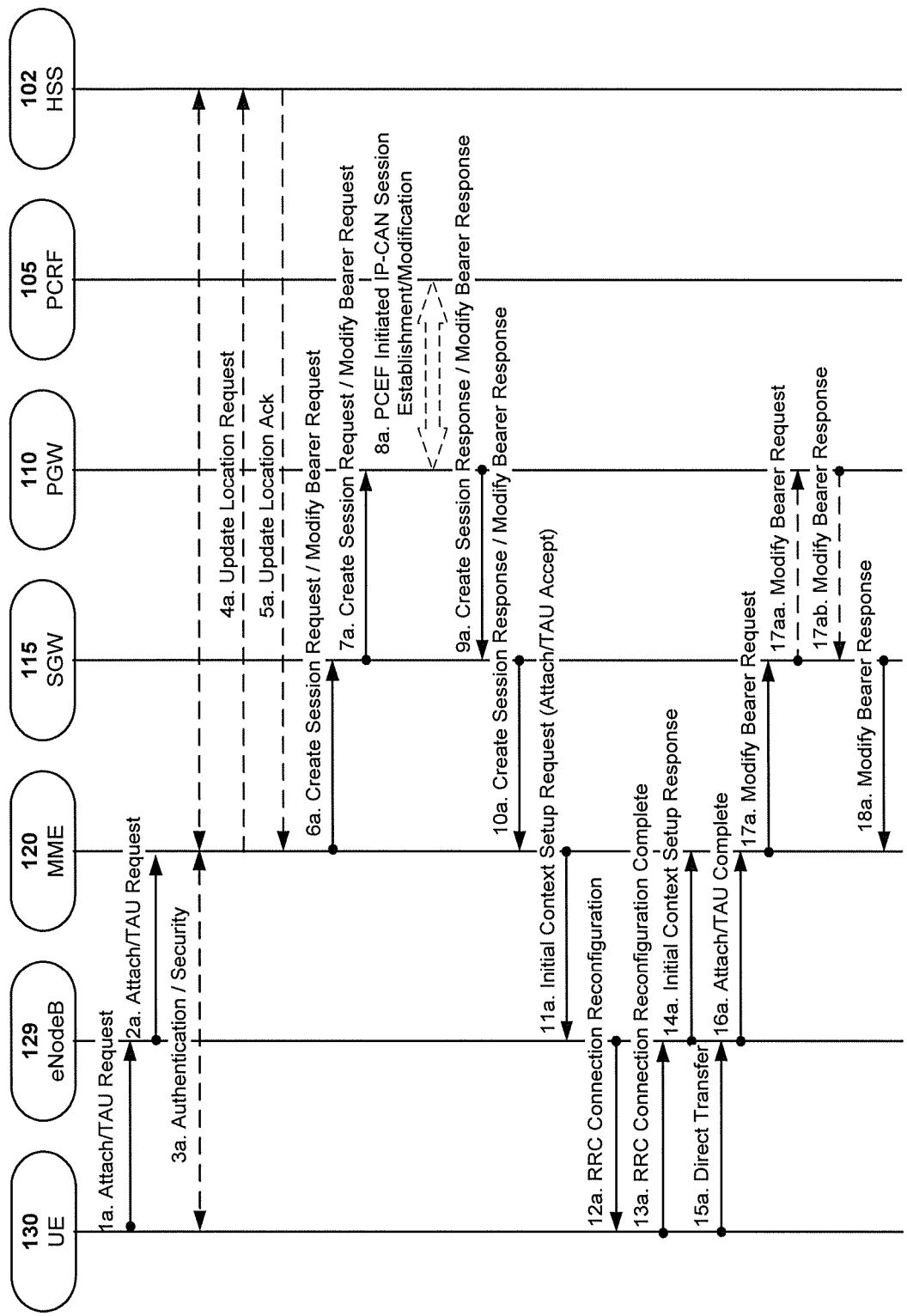
FIG. 6a is a signaling diagram illustrating exemplifying messages that may be exchanged between nodes in the wireless communication system 100 configured to implement at least some embodiments of the present solution.

FIG. 6a is a signaling diagram illustrating exemplifying messages that may be transmitted and/or received by nodes implementing at least some embodiments of the present solution in connection with an Attach/TAU procedure.

FIG. 6a shows the UE 130, the eNodeB 129, the MME 120, the SGW 115, the PGW 110, the PCRF 105 and a HSS 102 as previously describe for example with reference to FIG. 1.

The signalling diagram of FIG. 6a illustrates various action performed by and messages sent between the nodes 130, 129, 120, 115, 110, 105 and 102 as will be elaborated in some detail below.

Message 1a: The UE 130 may initiates the Attach/TAU (Tracking Area Update) procedure by the transmission, to the eNodeB 129, of an Attach/TAU Request.

Message 2a: The eNodeB 129 forwards the Attach/TAU Request message to the new MME 120 contained in a S1-MME control message (Initial UE message) together with the Selected Network, CSG access mode, CSG ID, L-GW address, and TAI+ECGI of the cell from where it received the message to the new MME 120.

Message 3a: The authentication and NAS security setup may be performed.

Message 4a: The MME 120 may send an Update Location Request message to the HSS 102.

Message 5a: The HSS 102 may acknowledge the Update Location message by sending an Update Location Ack message to the new MME 120.

Message 6a: The new MME 120 selects a SGW 115 and sends a Create Session Request or Modify Bearer Request in case of TAU (User Location Information (ECGI), UE Time Zone, User CSG Information, MS Info Change Reporting support indication) message to the selected SGW 115. Here, there may be no Boundary Information defined for the UE 130, and the MME 120 may then report the current UE location (ECGI+TAI) and/or indicate the current TAI list for the UE 130 to the SGW 115.

Message 7a: The SGW 115 creates a new entry in its EPS Bearer table and sends a Create Session Request or Modify Bearer Request in case of TAU (User Location Information (ECGI), UE Time Zone, User CSG Information, MS Info Change Reporting support indication) message to the PGW 110 indicated by the PGW address received in the previous message. SGW 115 will forward the current UE location (ECGI+TAI) and current TAI list for this UE 130 to the PGW 110.

Message 8a: If dynamic PCC is deployed, the IMSI, APN, UE IP address, User Location Information (ECGI), UE Time Zone, Serving Network, RAT type, APN-AMBR, Default EPS Bearer QoS may be provided to the PCRF 105. The User Location Information and UE Time Zone are used for location based charging. The PCRF 105 may modify the APN-AMBR and the QoS parameters (QCI and ARP) associated with the default bearer in the response to the PGW 110. The PCRF 105 may provide Boundary Information fitting for current location for the UE 130, otherwise the current TAI list suggested by MME 120 may be used as Boundary Information if no Boundary Information is returned by the PCRF 105.

Message 9a: The PGW 110 returns a Create Session Response or Modify Bearer Response in case of TAU (MS Info Change Reporting Action (Start) (if the PGW 110 decides to receive UE's location information during the session), CSG Information Reporting Action (Start) (if the PDN GW decides to receive UE's User CSG information during the session), Boundary Information) message to the SGW 115.

Message 10a: If the MS Info Change Reporting Action (Start) and/or the CSG Information Reporting Action (Start) and/or Boundary Information are received for this bearer context, then the SGW 115 may store this for the bearer context and the SGW 115 may report to the PGW 110 whenever a UE's location and/or User CSG information change occurs that meets the request of the PGW 110 now comprising Boundary Information for the UE 130.

The SGW 115 returns a Create Session Response or Modify Bearer Response in case of TAU (MS Info Change Reporting Action (Start), CSG Information Reporting Action (Start), Location Boundary List) message to the new MME 120.

Since the MME 120 has now been provided with the Boundary Information it can limit the report to the PGW 110 and/or the SGW 115 of any change in the location of the UE 130 to situations where the UE 130 has moved outside the boundary area indicated by the Boundary Information. This has the advantage of reducing the signaling load between the MME 120 and the PGW 110 and also between the PGW 110 and the PCRF 105, since no mobility information is provided by the MME 120 unless the UE 130 appears outside the boundary area. In other words, no mobility information is provided by the MME 120 as long as the UE 130 moves within the boundary area.

Message 11a: If the MS Info Change Reporting Action (Start) and/or the CSG Information Reporting Action (Start) and/or Boundary Information are received for this bearer context, then the MME 120 shall store this for the bearer context and the MME 120 shall report whenever a UE's location and/or User CSG information change occurs that meets the request.

The new MME 120 may additionally or alternatively send an Attach Accept message to the eNodeB 129.

Message 12a: The eNodeB 129 sends the RRC Connection Reconfiguration message including the EPS Radio Bearer Identity to the UE 130, and the Attach Accept message will be sent along to the UE 130.

Message 13a: The UE 130 sends the RRC Connection Reconfiguration Complete message to the eNodeB 129.

Message 14a: The eNodeB 129 sends the Initial Context Response message to the new MME 120.

Message 15a: The UE 130 sends a Direct Transfer message to the eNodeB 129, which includes the Attach Complete message.

Message 16a: The eNodeB 129 forwards the Attach Complete message to the new MME 120 in an Uplink NAS Transport message.

Message 17a: Upon reception of both, the Initial Context Response message, the new MME 120 sends a Modify Bearer Request message to the SGW 115.

Message 18a: The SGW 115 acknowledges by sending Modify Bearer Response message to the new MME 120.

Messages 1a-2a indicated above may be seen as one way of obtaining initial position information as indicated in operation 40a discussed above with reference to FIG. 4a.

Messages 6a-8a indicated above may be seen as one way of requesting the Boundary Information as indicated in operation 40b discussed above with reference to FIG. 4a. The request may be seen as initiated by the MME 120 sending a message to the PGW 110 via the SGW 115, c.f. messages 6a and 7a in FIG. 6a. Note that the geographical position of the UE 130 is provided in the request sent by the MME 120, c.f. for example the User Location Information (ECGI) and/or ECGI+TAI mentioned above.

Messages 8a-10a indicated above may be seen as one way of receiving the Boundary Information as indicated in operation 40 discussed above with reference to FIG. 4a. The receiving may be seen as initiated by the MME 120 sending a message comprising the position of the UE 130 to the PGW 110 via the SGW 115, c.f. messages 6a and 7a in FIG. 6a.

Figure 6B:
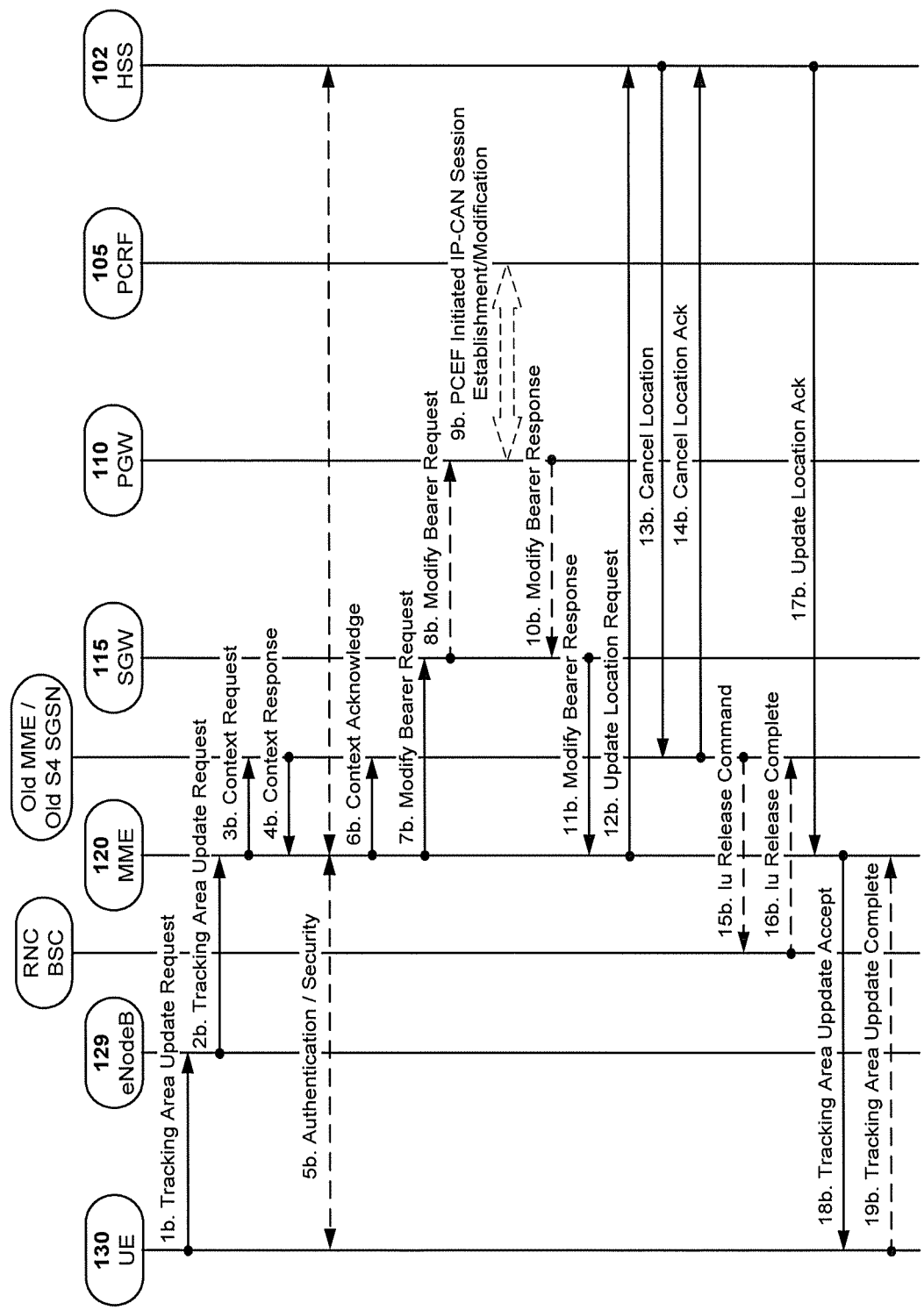
FIG. 6b is a signaling diagram illustrating exemplifying messages that may be exchanged between nodes in the wireless communication system 100 configured to implement at least some embodiments of the present solution.

FIG. 6b is a signaling diagram illustrating other exemplifying messages that may be transmitted and/or received by nodes implementing at least some embodiments of the present solution in connection with a procedure accomplish a Tracking Area Update without SGW change.

FIG. 6b shows the UE 130, the eNodeB 129, a RAN node (e.g. a RNC or a BSC), the MME 120, an Old MME or an Old SGSN, the SGW 115, the PGW 110, the PCRF 105 and a HSS 102 as previously describe for example with reference to FIG. 1.

The signalling diagram of FIG. 6b illustrates various action performed by and messages sent between the nodes 130, 129, 120, 115, 110, 105 and 102 as will be elaborated in some detail below.

Message 1b: The UE 130 initiates a TAU procedure by sending, to the eNodeB 129, a Tracking Area Update Request message together with RRC parameters indicating the Selected Network and the old GUMMEI.

Message 2b: The eNodeB 129 forwards the TAU Request message together with at least one of the CSG access mode, CSG ID, TAI+ECGI of the cell from where it received the message and with the Selected Network to the MME 120. CSG ID is provided by RAN if the UE 130 sends the TAU Request message via a CSG cell or a hybrid cell. CSG access mode is provided if the UE 130 sends the TAU Request message via a hybrid cell. If the CSG access mode is not provided but the CSG ID is provided, the MME 120 shall consider the cell as a CSG cell.

Message 3b: The new MME 120 differentiates the type of the old node, i.e. MME or SGSN, uses the GUTI received from the UE 130 to derive the old MME/S4 SGSN address and sends a Context Request message to the old MME/S4 SGSN to retrieve the user information.

Message 4b: If the Context Request is sent to an old MME/S4-SGSN, the old MME/S4-SGSN responds with a Context Response (MS Info Change Reporting Action (if available), CSG Information Reporting Action (if available), UE Time Zone) message.

Message 5b: The authentication functions may be performed.

Message 6b: The new MME 120 sends a Context Acknowledge message to the old MME/S4-SGSN.

Message 7b: If the MME has changed the new MME 120 adopts the bearer contexts received from the old MME/S4-SGSN as the UE's EPS bearer contexts to be maintained by the new MME 120. The MME 120 establishes the EPS bearer(s) in the indicated order.

If the MME has changed the new MME 120 sends a Modify Bearer Request (new MME address and TEID, ISR Activated, RAT type) message per PDN connection to the SGW 115. If the PGW 110 requested UE's location and/or User CSG information, the MME 120 also includes the User Location Information IE and/or User CSG Information IE in this message. If the UE Time Zone has changed, the MME 120 includes the UE Time Zone IE in this message. If there is no Boundary Information defined for the UE 130, then the MME 120 may report the current UE location (ECGI+TAI) and indicates current TAI list for the UE 130 to the SGW 115.

Message 8b: If the RAT type has changed, or the SGW 115 has received the User Location Information IE or the UE Time Zone IE or User CSG Information IE and/or the Serving Network IE from the MME 120, the SGW 115 informs the PGW 110 about this information that e.g. can be used for charging, by sending the message Modify Bearer Request (RAT type) per PDN connection to the PDN GW(s) concerned. User Location Information IE and/or UE Time Zone IE and/or User CSG Information IE and/or Serving Network IE are also included if they are present. SGW 115 may take a look whether current UE location is included in the agreed LBL from PGW, if not included, SGW 115 will forward the current UE location (ECGI+TAI) and current TAI list for the UE 130 to the PGW 110.

Message 9b: If dynamic PCC is deployed, and RAT type information or UE location information needs to be conveyed from the PGW 110 to the PCRF 105, then the PGW 110 shall send this information to the PCRF 105 by means of an IP-CAN Session Modification procedure.

Message 10b: The PGW 110 updates its context field to allow DL PDUs to be routed to the correct SGW. PGW 110 returns a Modify Bearer Response comprising Boundary Information (if assigned) to the SGW 115.

Message 11b: The SGW 115 updates its bearer context. The SGW 115 shall return a Modify Bearer Response (Serving GW address and TEID for uplink traffic, Boundary Information) message to the new MME 120 as a response to a Modify Bearer Request message, or a Modify Access Bearers Response (Serving GW address and TEID for uplink traffic, Boundary Information) as a response to a Modify Access Bearers Request message.

Since the MME 120 has now been provided with the Boundary Information it can limit the report to the PGW 110 and/or the SGW 115 of any change in the location of the UE 130 to situations where the UE 130 has moved outside the boundary area indicated by the Boundary Information. This has the advantage of reducing the signaling load between the MME 120 and the PGW 110 via the SGW 115 and also between the PGW 110 and the PCRF 105, since no mobility information is provided by the MME 120 unless the UE 130 appears outside the boundary area. In other words, no mobility information is provided by the MME 120 as long as the UE 130 moves within the boundary area.

Message 12b: The new MME 120 informs the HSS 102 of the change of MME by sending an Update Location Request message to the HSS 102.

Message 13b: The HSS 102 sends a Cancel Location (IMSI, Cancellation type) message to the old MME with a Cancellation Type set to Update Procedure.

Message 14b: When receiving a Cancel Location message and the timer started in step 4 is not running, the old MME removes the MM and bearer contexts.

Message 15b: When receiving the Context Acknowledge message and if the UE 130 is Iu Connected, the old SGSN sends an Iu Release Command message to the RNC after the timer started in step 4 has expired.

Message 16b: The RAN node responds with an Iu Release Complete message.

Message 17b: The HSS 102 acknowledges the Update Location Request by returning an Update Location Ack message to the new MME 120 after the cancelling of the old MME context is finished.

Message 18b: The MME 120 responds to the UE 130 with a Tracking Area Update Accept (GUTI, TAI-list, EPS bearer status, NAS sequence number, NAS-MAC, ISR Activated, IMS Voice over PS session supported, Emergency Service Support indicator, LCS Support Indication) message.

Message 19b: If the GUTI was changed the UE acknowledges the new GUTI by returning a Tracking Area Update Complete message to the MME.

Messages 1b-2b indicated above may be seen as one way of obtaining initial position information as indicated in operation 40a discussed above with reference to FIG. 4a.

Messages 7b-9b indicated above may be seen as one way of requesting the Boundary Information as indicated in operation 40b discussed above with reference to FIG. 4a. The request may be seen as initiated by the MME 120 sending a message to the PGW 110 via the SGW 115, c.f. messages 7b-8b in FIG. 6b. Note that the geographical position of the UE 130 is provided in the request sent by the MME 120, c.f. for example the User Location Information (ECGI) and/or ECGI+TAI mentioned above.

Messages 9b-11b indicated above may be seen as one way of receiving the Boundary Information as indicated in operation 40 discussed above with reference to FIG. 4a. The receiving may be seen as initiated by the MME 120 sending a message comprising the position of the UE 130 to the PGW 110 via the SGW 115, c.f. messages 7b and 8b in FIG. 6b.

Figure 6C:
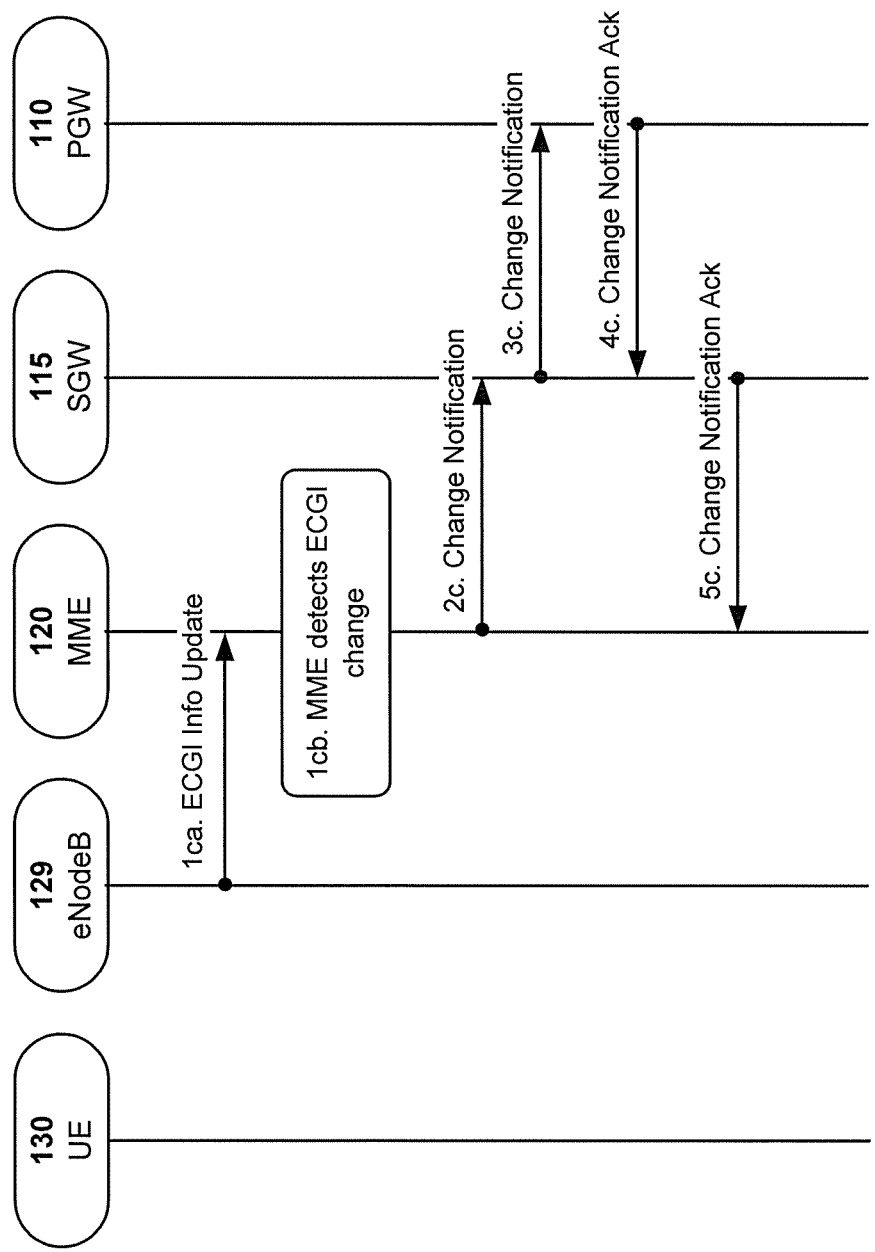
FIG. 6c is a signaling diagram illustrating exemplifying messages that may be exchanged between nodes in the wireless communication system 100 configured to implement at least some embodiments of the present solution.

FIG. 6c is a signaling diagram illustrating other exemplifying messages that may be transmitted and/or received by nodes implementing at least some embodiments of the present solution in connection with a Notification of the ECGI information change procedure (E-UTRAN Cell Global Identifier, ECGI).

FIG. 6c shows the UE 130, the eNodeB 129, the MME 120, the SGW 115 and the PGW 110 as previously describe for example with reference to FIG. 1.

The signalling diagram of FIG. 6c illustrates various action performed by and messages sent between the nodes 130, 129, 120, 115 and 110 as will be elaborated in some detail below.

Message 1ca: If the ECGI of the UE 130 changes, the MME 120 receives the ECGI information Update from the eNodeB 129.

Message 1cb: The MME 120 detects that the ECGI information has changed by comparing with the MME stored ECGI list for the boundary list.

Message 2c: If the MME 120 has been requested to report the ECGI to the PGW 110 for the UE 130, the MME 120 shall send the Change Notification message to the SGW 115 indicating the new ECGI. The MME 120 stores the notified ECGI information.

Message 3c: The SGW 115 forwards the Change Notification message to the PGW 110. If dynamic PCC is deployed, and ECGI changes need to be conveyed to the PCRF 115, then the PGW 110 shall send this information to the PCRF (not shown in FIG. 6c).

Message 4c: The PGW 110 sends the Change Notification Ack to the SGW 115 with new Boundary Information list where it is preferred that the current ECGI is included if the Boundary Information (e.g. the boundary area) is changed.

Message 5c: The SGW 115 forwards the Change Notification Ack to the MME 120 with new Boundary Information, preferably with the current ECGI included if the Boundary Information (e.g. the boundary area) has changed.

Since the MME 120 has now been provided with the Boundary Information it can limit the report to the PGW 110 and/or the SGW 115 of any change in the location of the UE 130 to situations where the UE 130 has moved outside the boundary area indicated by the Boundary Information. This has the advantage of reducing the signaling load between the MME 120 and the PGW 110 via the SGW 115 and also between the PGW 110 and the PCRF 105 (not shown in FIG. 6c), since no mobility information is provided by the MME 120 unless the UE 130 appears outside the boundary area. In other words, no mobility information is provided by the MME 120 as long as the UE 130 moves within the boundary area.

Message 1ca indicated above with reference to FIG. 6c may be seen as one way of obtaining initial position information as indicated in operation 40a discussed above with reference to FIG. 4a.

Messages 2c and 3c indicated above may be seen as one way of requesting the Boundary Information as indicated in operation 40 discussed above with reference to FIG. 4a. The request may be seen as initiated by the MME 120 sending a message to the PGW 110 via the SGW 115, c.f. messages 2c-3c in FIG. 6c. Note that the geographical position of the UE 130 is provided in the request sent by the MME 120, c.f. for example the ECGI mentioned above.

Message 1ca indicated above may be seen as one way of obtaining initial position information as indicated in operation 40a discussed above with reference to FIG. 4a.

Messages 2c-3c indicated above may be seen as one way of requesting the Boundary Information as indicated in operation 40b discussed above with reference to FIG. 4a. The request may be seen as initiated by the MME 120 sending a message to the PGW 110 via the SGW 115. Note that the geographical position of the UE 130 is provided in the request sent by the MME 120, c.f. for example the User Location Information (ECGI) mentioned above.

Messages 4c and 5c indicated above may be seen as one way of receiving the Boundary Information as indicated in operation 40b discussed above with reference to FIG. 4a. The receiving may be seen as initiated by the MME 120 sending a message comprising the position of the UE 130 to the PGW 110 via the SGW 115, c.f. messages 2c and 3c in FIG. 6c.

Figure 6D:
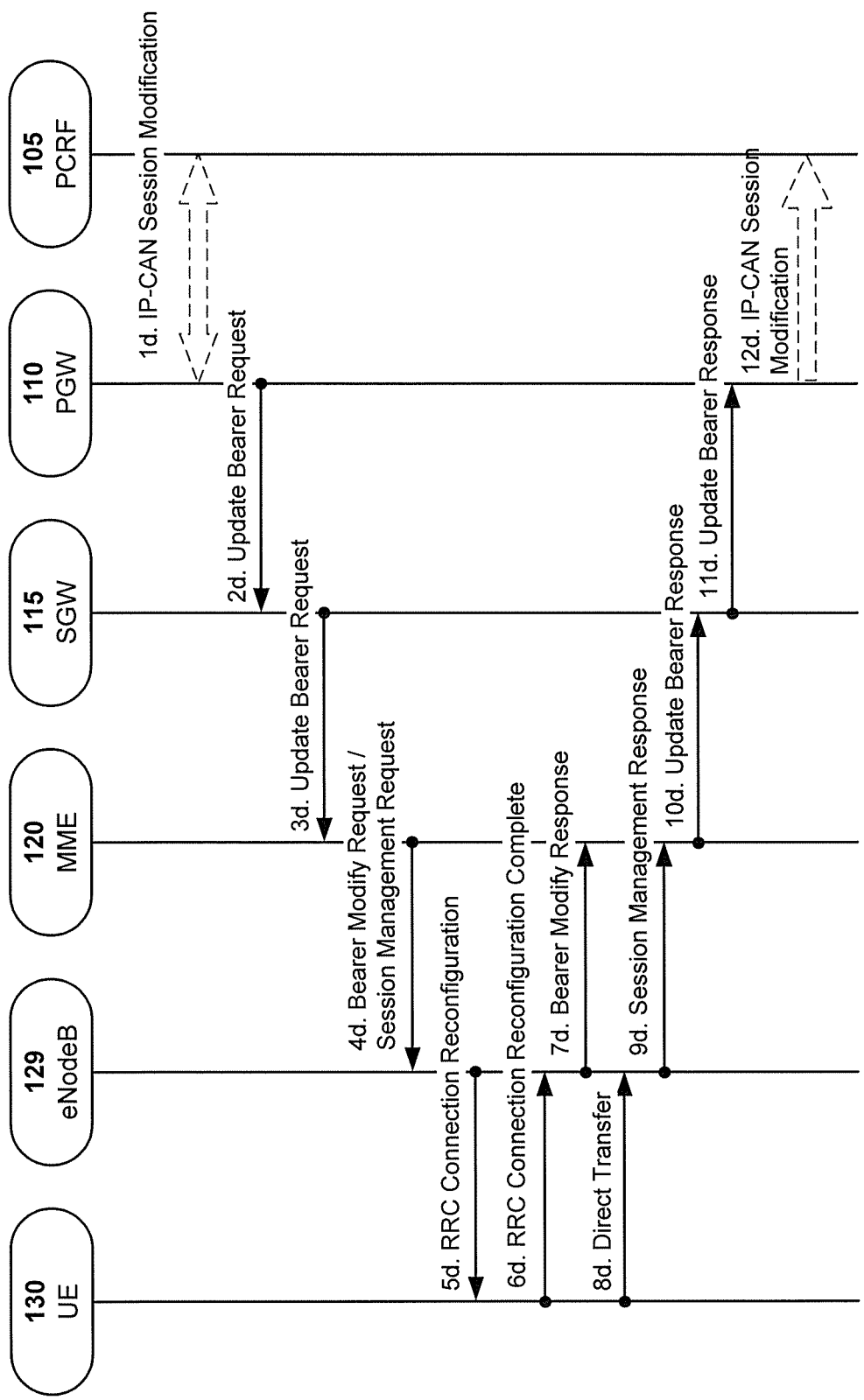
FIG. 6d is a signaling diagram illustrating exemplifying messages that may be exchanged between nodes in the wireless communication system 100 configured to implement at least some embodiments of the present solution.

FIG. 6d is a signaling diagram illustrating other exemplifying messages that may be transmitted and/or received by nodes implementing at least some embodiments of the present solution in connection with a Bearer Modification Procedure with Bearer QoS Update.

FIG. 6d shows the UE 130, the eNodeB 129, the MME 120, the SGW 115, the PGW 110 and the PCRF 105 as previously describe for example with reference to FIG. 1.

The signalling diagram of FIG. 6d illustrates various action performed by and messages sent between the nodes 130, 129, 120, 115, 110 and 105 as will be elaborated in some detail below.

Message 1d: If dynamic PCC is deployed, the PCRF 105 sends a PCC decision provision (QoS policy) message to the PGW 110. This corresponds to the initial steps of the PCRF-Initiated IP-CAN Session Modification procedure or to the PCRF response in the PCEF initiated IP-CAN Session Modification procedure, up to the point that the PDN GW requests IP-CAN Bearer Signalling. If dynamic PCC is not deployed, the PGW 110 may apply local QoS policy. Here, a new Boundary Information may be assigned by a SACC node (e.g. the PCRF 105) and included in this message 1*d*.

Message 2*d*: The PGW 110 may use this QoS policy to determine that the authorized QoS of a service data flow has changed or that a service data flow shall be aggregated to or removed from an active bearer. The PGW 110 may generate the TFT and update the EPS Bearer QoS to match the traffic flow aggregate. The PGW 110 may then send the Update Bearer Request (PTI, EPS Bearer Identity, EPS Bearer QoS, APN-AMBR, TFT) message to the SGW 115. The Procedure Transaction Id (PTI) parameter may be used when the procedure was initiated by a UE Requested Bearer Resource Modification Procedure. For APN-AMBR, the EPS bearer identity must refer to a non-GBR bearer. It is preferred that this message 2*d* comprises the new Boundary Information if assigned by the SACC component as indicated above when discussing message 1*d*.

Message 3*d*: The SGW 115 sends the Update Bearer Request (PTI, EPS Bearer Identity, EPS Bearer QoS, TFT, APN-AMBR) message to the MME 120. If the UE 130 is in ECM-IDLE state the MME 120 will trigger the Network Triggered Service Request. If only the QoS parameter ARP is modified and if the UE 130 is in ECM IDLE state the MME 120 shall skip the Network Triggered Service Request. It is preferred that this message 3*d* comprises the new Boundary Information if assigned by the SACC component as indicated above when discussing message 1*d*.

Since the MME 120 has now been provided with the Boundary Information it can limit the report to the PGW 110 and/or the SGW 115 of any change in the location of the UE 130 to situations where the UE 130 has moved outside the boundary area indicated by the Boundary Information. This has the advantage of reducing the signaling load between the MME 120 and the PGW 110 via the SGW 115 and also between the PGW 110 and the PCRF 105, since no mobility information is provided by the MME 120 unless the UE 130 appears outside the boundary area. In other words, no mobility information is provided by the MME 120 as long as the UE 130 moves within the boundary area.

Message 4*d*: The MME 120 builds a Session Management Request e.g. including the PTI, EPS Bearer QoS parameters (excluding ARP), TFT, APN-AMBR and EPS Bearer Identity. If the UE 130 has UTRAN or GERAN capabilities and the network supports mobility to UTRAN or GERAN, the MME 120 may use the EPS Bearer QoS parameters to derive the corresponding PDP context parameters QoS Negotiated (R99 QoS profile), Radio Priority and Packet Flow Id and includes them in the Session Management Request. If the UE 130 indicated in the UE Network Capability does not support BSS packet flow procedures, then the MME 120 may not include the Packet Flow Id. If the APN-AMBR has changed the MME may update the UE-AMBR if appropriate. The MME 120 may then send the Bearer Modify Request (EPS Bearer Identity, EPS Bearer QoS, Session Management Request, UE-AMBR) message to the eNodeB. If the new Boundary Information is received, the MME 120 should check whether current location is within the boundary area indicated by the boundary information. If not, the MME 120 should trigger a standalone Location Report procedure to get new Boundary Information, e.g. as indicated in FIG. 6*c*.

Message 5*d*: The eNodeB 129 maps the modified EPS Bearer QoS to the Radio Bearer QoS. It then signals a RRC Connection Reconfiguration (Radio Bearer QoS, Session Management Request, EPS RB Identity) message to the UE 130. The UE 130 shall store the QoS Negotiated, Radio Priority, Packet Flow Id, which it received in the Session Management Request, for use when accessing via GERAN or UTRAN. If the APN-AMBR has changed, the UE 130 stores the modified APN-AMBR value and sets the MBR parameter of the corresponding non-GBR PDP contexts (of this PDN connection) to the new value. The UE 130 uses the uplink packet filter (UL TFT) to determine the mapping of traffic flows to the radio bearer. The UE 130 may provide EPS Bearer QoS parameters to the application handling the traffic flow(s). The application usage of the EPS Bearer QoS is implementation dependent. The UE 130 shall not reject the Radio Bearer Modify Request on the basis of the EPS Bearer QoS parameters contained in the Session Management Request. The UE 130 shall set its TIN to "GUTI" if the modified EPS bearer was established before ISR activation.

Message 6*d*: The UE 130 acknowledges the radio bearer modification to the eNodeB with a RRC Connection Reconfiguration Complete message.

Message 7*d*: The eNodeB 129 acknowledges the bearer modification to the MME 120 with a Bearer Modify Response (EPS Bearer Identity) message. With this message, the eNodeB 129 indicates whether the requested EPS Bearer QoS could be allocated or not.

The MME 120 shall be prepared to receive this message either before or after the Session Management Response message.

Message 8*d*: The UE NAS layer builds a Session Management Response including EPS Bearer Identity. The UE 130 then sends a Direct Transfer (Session Management Response) message to the eNodeB.

Message 9*d*: The eNodeB 129 sends an Uplink NAS Transport (Session Management Response) message to the MME 120.

Message 10*d*: Upon reception of the Bearer Modify Response message and the Session Management Response message, the MME 120 acknowledges the bearer modification to the SGW 115 by sending an Update Bearer Response (EPS Bearer Identity) message.

Message 11*d*: The SGW 115 acknowledges the bearer modification to the PGW 110 by sending an Update Bearer Response (EPS Bearer Identity) message.

Message 12*d*: If the Bearer modification procedure was triggered by a PCC Decision Provision message from the PCRF 105, the PGW 110 indicates to the PCRF 105 whether the requested PCC decision (QoS policy) could be enforced or not by sending a Provision Ack message allowing the completion of the PCRF-Initiated IP-CAN Session Modification procedure or the PCEF initiated IP-CAN Session Modification procedure, after the completion of IP-CAN bearer signalling.

Messages 1*d*, 2*d* and 3*d* indicated above may be seen as one way of receiving the Boundary Information as indicated in operation 40*b* discussed above with reference to FIG. 4*a*. The receiving may be seen as initiated by a SACC component, e.g. the PCRF 105, c.f. message 1*d* in FIG. 6*d*.

Figure 6E:
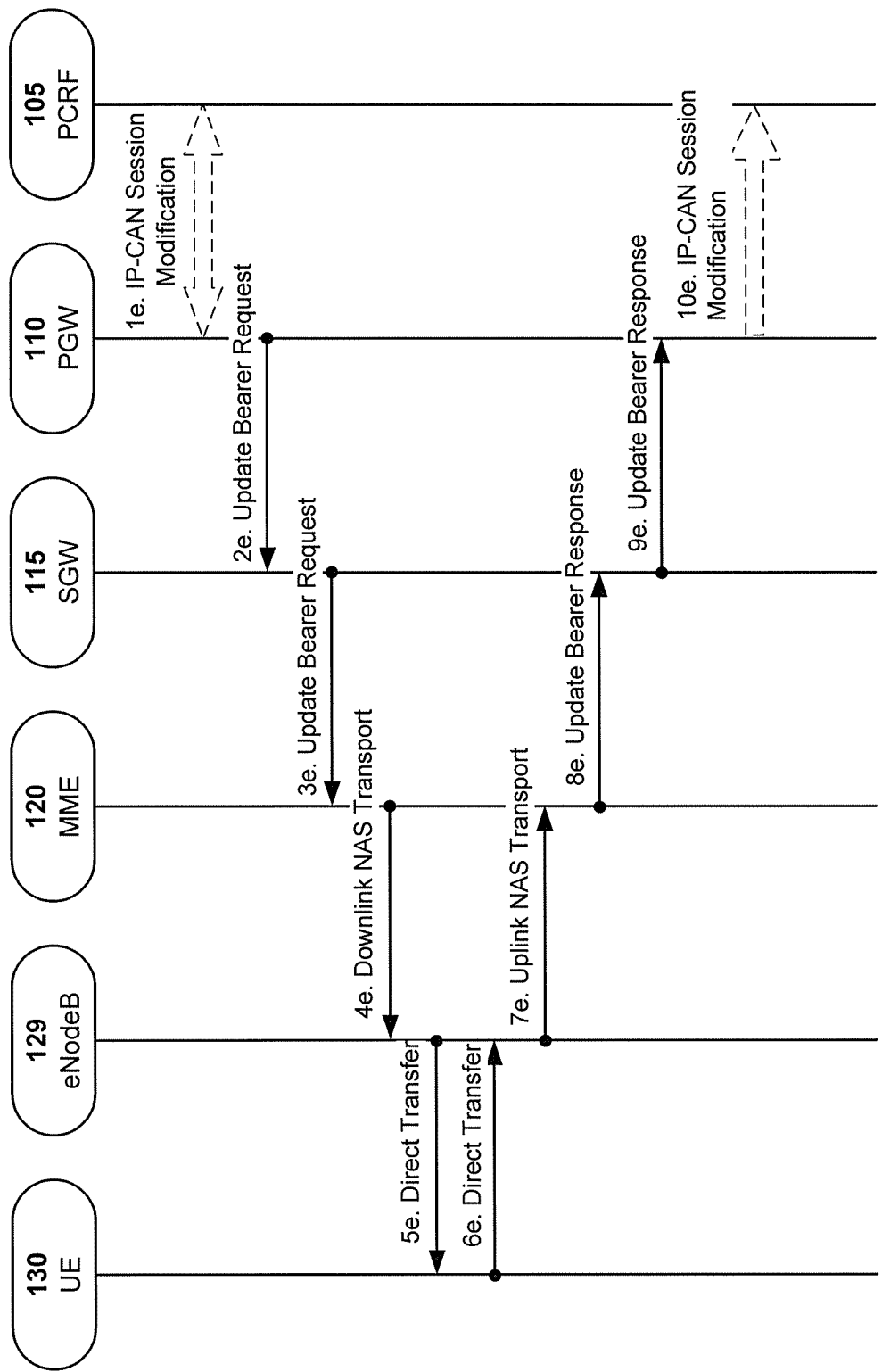
FIG. 6e is a signaling diagram illustrating exemplifying messages that may be exchanged between nodes in the wireless communication system 100 configured to implement at least some embodiments of the present solution.

FIG. 6*e* is a signaling diagram illustrating other exemplifying messages that may be transmitted and/or received by nodes implementing at least some embodiments of the present solution in connection with a Bearer Modification Procedure without Bearer QoS Update.

FIG. 6e shows the UE 130, the eNodeB 129, the MME 120, the SGW 115, the PGW 110 and the PCRF 105 as previously describe for example with reference to FIG. 1.

The signalling diagram of FIG. 6e illustrates various action performed by and messages sent between the nodes 130, 129, 120, 115, 110 and 105 as will be elaborated in some detail below.

Message 1e: If dynamic PCC is deployed, the PCRF 105 sends a PCC decision provision (QoS policy) message to the PGW 110. This corresponds to the beginning of the PCRF-initiated IP-CAN Session Modification procedure or to the PCRF response in the PCEF initiated IP-CAN Session Modification procedure, up to the point that the PGW 110 requests IP-CAN Bearer Signalling. If dynamic PCC is not deployed, the PGW 110 may apply local QoS policy. Here, a new Boundary Information may be assigned by a SACC node (e.g. the PCRF 105) and included in this message 1e.

Message 2e: The PGW 110 may use this QoS policy to determine that a service data flow shall be aggregated to or removed from an active bearer. The PGW 110 may generate the TFT and determine that no update of the EPS Bearer QoS is needed. The PGW 110 may then send the Update Bearer Request (PTI, EPS Bearer Identity, APN-AMBR, TFT) message to the SGW 115. The Procedure Transaction Id (PTI) parameter may be used when the procedure was initiated by a UE Requested Bearer Resource Modification procedure. Here, the new Boundary Information assigned by the SACC node (e.g. the PCRF 105) may be forwarded by the PGW 110 to SGW 115 in this message 2d.

Message 3e: The SGW 115 sends the Update Bearer Request (PTI, EPS Bearer Identity, APN-AMBR, TFT) message to the MME. If the UE is in ECM-IDLE state the MME will trigger the Network Triggered Service Request. Here, the new Boundary Information assigned by the SACC node (e.g. the PCRF 105) may be forwarded by the SGW 115 to MME 120 in this message 3d.

Message 4e: The MME 120 builds a Session Management Request message including the TFT, APN-AMBR and EPS Bearer Identity. The MME 120 then sends a Downlink NAS Transport (Session Management Configuration) message to the eNodeB. If the APN AMBR has changed, the MME may also update the UE AMBR. And if the UE-AMBR is updated, the MME signal a modified UE-AMBR value to the eNodeB 129 by using S1-AP UE Context Modification Procedure. If new Boundary Information is received as indicated above, the MME 120 should check whether current location of the UE 130 is within the Boundary Area. If not, the MME 120 may trigger a standalone Location Report procedure to get new Boundary Information again, e.g. as previously described with reference to FIG. 6c.

Message 5e: The eNodeB 129 sends the Direct Transfer (Session Management Request) message to the UE 130. The UE 130 uses the uplink packet filter (UL TFT) to determine the mapping of traffic flows to the radio bearer. The UE 130 stores the modified APN-AMBR value and sets the MBR parameter of the corresponding non-GBR PDP contexts (of this PDN connection) to the new value.

Message 6e: The UE NAS layer builds a Session Management Response including EPS Bearer Identity. The UE 130 then sends a Direct Transfer (Session Management Response) message to the eNodeB 129.

Message 7e: The eNodeB 129 sends an Uplink NAS Transport (Session Management Response) message to the MME 120.

Message 8e: The MME 120 acknowledges the bearer modification to the SGW 115 by sending an Update Bearer Response (EPS Bearer Identity) message.

Message 9e. The SGW 115 acknowledges the bearer modification to the PDN GW by sending an Update Bearer Response (EPS Bearer Identity) message.

Message 10e: If the bearer modification procedure was triggered by a PCC Decision Provision message from the PCRF 105, the PGW 110 indicates to the PCRF 105 whether the requested PCC decision (QoS policy) could be enforced or not by sending a Provision Ack message. This then allows the PCRF-Initiated IP-CAN Session Modification procedure or the PCEF-initiated IP-CAN Session Modification procedure to continue and eventually conclude, proceeding after the completion of IP-CAN bearer signalling.

Messages 1e, 2e and 3e indicated above may be seen as one way of receiving the Boundary Information as indicated in operation 40b discussed above with reference to FIG. 4a. The receiving may be seen as initiated by a SACC component, e.g. the PCRF 105, c.f. message 1e in FIG. 6e.

Some embodiments described herein may be summarized in the following manner:

One embodiment is directed to a method in a mobility management node for reducing signaling caused by changes of position of a radio terminal. The mobility management node may be configured to be operatively comprised by a wireless communication system, and to operatively manage the mobility of the radio terminal, and to operatively communicate with a gateway node. It is preferred that the gateway node is configured to operatively act as an interface between the wireless communication system and an external network. The gateway node may comprise a Policy and Charging Enforcement Function (PCEF).

It is preferred that the method comprises the actions of:
obtaining initial position information indicating an initial position for the radio terminal,
obtaining boundary information based on the initial position information, which boundary information indicates a boundary area wherein at least one of a policy or a charging rule is to be applied for the radio terminal,
obtaining current position information indicating the current position of the radio terminal,
determining whether the radio terminal is inside or outside the boundary area based on the boundary information and the position information,
providing mobility information, indicating the current position of the radio terminal, to the gateway node when the radio terminal is outside the boundary area and not providing mobility information to the gateway node when the radio terminal is inside the boundary area.

The boundary information may be obtained by:
sending a request message to the gateway node and/or a SACC node of the system indicating that boundary information is requested, and
receiving a response message from the gateway node and/or the SACC node, which response message comprises the boundary information.

The boundary information may be obtained by:
sending a notification message to the gateway node and/or the SACC node (105, 205) of the system indicating that boundary information is requested,
receiving an acknowledge message from the gateway node and/or the SACC node, which acknowledge message comprises the boundary information.

The message sent to the gateway node and/or to the SACC node may comprise the initial position information indicating the initial position of the radio terminal (130, 230).

The boundary information may be obtained by receiving a request message from a gateway node and/or the SACC node of the system (100, 200), which request message comprises the boundary information.

Determining whether the radio terminal is inside or outside the boundary area may comprise the actions of comparing the boundary information with the position information.

The mobility information may be provided in a message sent to the gateway node.

Another second boundary information may be obtained based on the current position information, which other boundary information indicates another boundary area wherein at least one of another policy or another charging rule is to be applied for the radio terminal.

Some other embodiments described herein may be summarized in the following manner:

One other embodiment is directed to a mobility management node configured to be operatively comprised by a wireless communication system, and to operatively manage the mobility of a radio terminal, and to operatively communicate with a gateway node acting as an interface between the wireless communication system and an external network. The gateway node may comprise a Policy and Charging Enforcement Function (PCEF).

The mobility management node is further configured to operatively:
  obtain initial position information indicating an initial position for the radio terminal,
  obtain boundary information based on the initial position information, which boundary information indicates a boundary area wherein at least one of a policy or a charging rule is to be applied for the radio terminal,
  obtain current position information indicating the current position of the radio terminal,
  determine whether the radio terminal is inside or outside the boundary area based on the boundary information and the position information,
  provide mobility information, indicating the current position of the radio terminal, to the gateway node when the radio terminal is outside the boundary area, and not provide mobility information to the gateway node when the radio terminal is inside the boundary area so as to reduce signalling caused by changes of position of the radio terminal.

The mobility management node may be configured to operatively:
  send a request message to the gateway node and/or a SACC node of the system indicating that boundary information is requested, and
  receive a response message from the gateway node and/or the SACC node, which response message comprises the boundary information.

The mobility management node may be configured to operatively:
  send a notification message to the gateway node and/or the SACC node of the system indicating that boundary information is requested,
  receive an acknowledge message from the gateway node and/or the SACC node, which acknowledge message comprises the boundary information.

The mobility management node may be configured to operatively include the initial position information indicating the initial position of the radio terminal in the message sent to the gateway node and/or to the SACC node.

The mobility management node may be configured to receive a request message from the gateway node and/or the SACC node of the system, which request message comprises the boundary information.

The mobility management node may be configured to determine whether the radio terminal (130, 230) is inside or outside the boundary area by comparing the boundary information with the position information.

The mobility management node may be configured to operatively provide the mobility information in a message sent to the gateway node.

The example embodiments presented herein are not limited to LTE, but may apply in any RAN, single- or multi-RAT. Some other RAT examples are LTE-Advanced, UMTS, HSPA, GSM, cdma2000, HRPD, WiMAX, and WiFi or similar. The foregoing description of the example embodiments have been presented for purposes of illustration and description.

The foregoing description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that any of the example embodiments presented herein may be used in conjunction, or in any combination, with one another.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the example embodiments, that the example embodiments may be implemented at least in part by means of both hardware and software, and that several "means", "units" or "devices" may be represented by the same item of hardware.

The various example embodiments described herein are described in the general context of method steps or processes, which may be implemented in one aspect by a computer program product, embodied in a computer-readable medium, including computer-executable instructions, such as program code, and executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

ABBREVIATIONS

S1-MME: Reference point for the control plane protocol between E-UTRAN and MME.

S1-U: Reference point between E-UTRAN and Serving GW for the per bearer user plane tunneling and inter eNodeB path switching during handover.

S3: It enables user and bearer information exchange for inter 3GPP access network mobility in idle and/or active state.

S4: It provides related control and mobility support between GPRS Core and the 3GPP Anchor function of Serving GW. In addition, if Direct Tunnel is not established, it provides the user plane tunneling.

S5: It provides user plane tunneling and tunnel management between Serving GW and PDN GW. It is used for Serving GW relocation due to UE mobility and if the Serving GW needs to connect to a non-collocated PDN GW for the required PDN connectivity.

S6a: It enables transfer of subscription and authentication data for authenticating/authorizing user access to the evolved system (AAA interface) between MME and HSS.

Gx: It provides transfer of (QoS) policy and charging rules from PCRF to Policy and Charging Enforcement Function (PCEF) in the PDN GW.

S8: Inter-PLMN reference point providing user and control plane between the Serving GW in the VPLMN and the PDN GW in the HPLMN. S8 is the inter PLMN variant of S5.

S9: It provides transfer of (QoS) policy and charging control information between the Home PCRF and the Visited PCRF in order to support local breakout function.

S10: Reference point between MMEs for MME relocation and MME to MME information transfer.

S11: Reference point between MME and Serving GW.

S12: Reference point between UTRAN and Serving GW for user plane tunneling when Direct Tunnel is established. It is based on the Iu-u/Gn-u reference point using the GTP-U protocol as defined between SGSN and UTRAN or respectively between SGSN and GGSN. Usage of S12 is an operator configuration option.

S13: It enables UE identity check procedure between MME and EIR.

SGi: It is the reference point between the PDN GW and the packet data network. Packet data network may be an operator external public or private packet data network or an intra operator packet data network, e.g. for provision of IMS services. This reference point corresponds to Gi for 3GPP accesses.

Rx: The Rx reference point resides between the AF and the PCRF in the TS 23.203 [6].

AF Application Function
AN Access Network
ARP Allocation and Retention Priority
AMBR Aggregate Maximum Bit Rate
ANDSF Access Network Discovery and Selection Function
BBERF Bearer Binding and Event Reporting Function
BSC Base Station Controller
BSS Base Station System
BSSGP Base Station System GPRS Protocol
CBC Cell Broadcast Centre
CBE Cell Broadcast Entity
CCoA Collocated Care-of-address
CN Core Network
CSG Closed Subscriber Group
CSG ID Closed Subscriber Group Identity
DL TFT DownLink Traffic Flow Template
DSMIPv6 Dual-Stack MIPv6
eAN enhanced AN
ECGI E-UTRAN Cell Global Identifier
ECM EPS Connection Management
ECN Explicit Congestion Notification
eGTP evolved GPRS Tunnelling Protocol
eNodeB enhanced Node B
EMM EPS Mobility Management
EPC Evolved Packet Core
EPS Evolved Packet System
ePDG Evolved Packet Data Gateway
E-RAB E-UTRAN Radio Access Bearer
E-UTRAN Evolved Universal Terrestrial Radio Access Network
FACoA Foreign Agent Care-of-Address
GBR Guaranteed Bit Rate
GGSN Gateway GPRS Support Node
GPRS General Packet Radio Service
GRE Generic Routing Encapsulation
GSM Global System for Mobile Communications
GTP GPRS Tunneling Protocoll
GTP-C GTP control
GTP-U GTP user data tunneling
GUMMEI Globally Unique MME Identifier
GUTI Globally Unique Temporary Identity
GW Gateway
H ANDSF Home-ANDSF
HeNB Home eNode B
HeNB GW Home eNode B Gateway
HFN Hyper Frame Number
HO HandOver
HRPD High Rate Packet Data
HSS Home Subscriber Server
HSGW HRPD Serving GateWay
IE Information Element
IETF Internet Engineering Task Force
IMSI International Mobile Subscriber Identity
IFOM IP Flow Mobility
IP Internet Protocol
IPMS IP Mobility management Selection
ISR Idle mode Signalling Reduction
LBI Linked EPS Bearer Id
L-GW Local GateWay
LIPA Local IP Access
LMA Local Mobility Anchor
LTE Long Term Evolution
MAG Mobile Access Gateway
MAPCON Multi Access PDN Connectivity
MBR Maximum Bit Rate
MIB Minimum Bit Rate
MIPv4 Mobile IP version 4
MIPv6 Mobile IP version 6
MME Mobility Management Entity
MMEC MME Code
MTC Machine-Type Communications
M-TMSI M-Temporary Mobile Subscriber Identity
OFCS Offline Charging System
OMC-ID Operation and Maintenance Centre Identity
PCC Policy and Charging Control
PCF Packet Control Function
PCEF Policy and Charging Enforcement Function
PCRF Policy and Charging Rules Function
PDN Packet Data Network
PDP Packet Data Protocol
PGW PDN Gateway
PDCP Packet Data Convergence Protocol
PMIP Proxy Mobile IP PMIPv6 Proxy Mobile IP version 6
PSAP Public Safety Answering Point
PTI Procedure Transaction Id
QCI QoS Class Identifier
QoS Quality of Service
OCS Online Charging Systems
QSUP QoS based on Service information in User Plane protocol
RAN Radio Access Network
RFSP RAT/Frequency Selection Priority
RANAP Radio Access Network Application Part
RNC Radio Network Controller
SACC Service Aware Charging and Control
SAI Service Area Identifier
SGSN Serving GPRS Support Node
SGW Serving Gateway
SectorID Sector Address Identifier
S-TMSI S-Temporary Mobile Subscriber Identity
SDF Service Data Flow
SI Service Identification
SIPTO Selected IP Traffic Offload
TAC Tracking Area Code
TAD Traffic Aggregate Description
TAI Tracking Area Identity
TAU Tracking Area Update
TDF Traffic Detection Function
TEID Tunnel End Point Identifier
TI Transaction Identifier
TIN Temporary Identity used in Next update
TDF Traffic Detection Function
UE User Equipment
UDP User Datagram Protocol
UMTS Universal Mobile Telecommunications System
URRP-MME UE Reachability Request Parameter for MME
UL TFT UpLink Traffic Flow Template
ULR-Flags Update Location Request Flags
V ANDSF Visited-ANDSF
VS Vendor Specific

The invention claimed is:

1. A method in a mobility management node for reducing signalling caused by changes of location of a radio terminal, which mobility management node is configured to be operatively comprised by a wireless communication system and to operatively manage the mobility of the radio terminal and to operatively communicate with a gateway node acting as an interface between the system and an external network, wherein the method comprises:
   obtaining boundary information transmitted by one or more of the gateway node and a Service Aware Charging and Control, SACC, node of the system, which boundary information indicates a boundary area wherein at least one of a policy or a charging rule is to be applied for the radio terminal;
   obtaining current position information indicating the current position of the radio terminal;
   determining whether the radio terminal is inside or outside the boundary area based on the boundary information and the current position information; and
   sending a message comprising mobility information to the gateway node indicating the current position of the radio terminal when the radio terminal is outside the boundary area, and sending no mobility information to the gateway node when the radio terminal changes its position within the boundary area.

2. The method according to claim 1, wherein the boundary information is obtained by:
   sending a request message to one or more of the gateway node and the SACC node indicating that boundary information is requested; and
   receiving a response message from one or more of the gateway node and the SACC node, which response message comprises the boundary information.

3. The method according to claim 1, wherein the boundary information is obtained by:
   sending a notification message to one or more of the gateway node and the SACC node of the system indicating that boundary information is requested; and
   receiving an acknowledge message from one or more of the gateway node and the SACC node, which acknowledge message comprises the boundary information.

4. The method according to claim 2, wherein the request message sent to one or more of the gateway node and the SACC node includes initial position information indicating an initial position of the radio terminal.

5. The method according to claim 1, wherein the boundary information is obtained by:
   receiving a request message from one or more of the gateway node and the SACC node of the system, which request message comprises the boundary information.

6. The method according to claim 1 further comprising:
   determining whether the radio terminal is inside or outside the boundary area by comparing the boundary information with the position information.

7. The method according to claim 1 further comprising:
   providing the mobility information in a message sent to the gateway node.

8. The method according to claim 1 further comprising:
   obtaining another boundary information based on the current position information, which other boundary information indicates another boundary area wherein at least one of another policy or another charging rule is to be applied for the radio terminal.

9. A mobility management node configured to be operatively comprised by a wireless communication system, and to operatively manage the mobility of a radio terminal, and to operatively communicate with a gateway node acting as an interface between the system and an external network, which mobility management node is further configured to operatively:
   obtain boundary information transmitted by one or more of the gateway node and a Service Aware Charging and Control, SACC, node of the system, which boundary information indicates a boundary area wherein at least one of a policy or a charging rule is to be applied for the radio terminal;
   obtain current position information indicating the current position of the radio terminal;
   determine whether the radio terminal is inside or outside the boundary area based on the boundary information and the current position information; and
   send a message comprising mobility information to the gateway node indicating the current position of the radio terminal when the radio terminal is outside the boundary area, and send no mobility information to the gateway node when the radio terminal changes its position within the boundary area.

10. The mobility management node according to claim 9, wherein the mobility management node is configured to operatively:
   send a request message to one or more of the gateway node and the SACC node indicating that boundary information is requested; and receive a response message from one or more of the gateway node and the SACC node, which response message comprises the boundary information.

11. The mobility management node according to claim 9, wherein the mobility management node is configured to operatively:
send a notification message to one or more of the gateway node and the SACC node of the system indicating that boundary information is requested; and
receive an acknowledge message from one or more of the gateway node and the SACC node, which acknowledge message comprises the boundary information.

12. The mobility management node according to claim 10, wherein the mobility management node is configured to operatively include initial position information indicating an initial position of the radio terminal in the request message sent to one or more of the gateway node and to the SACC node.

13. The mobility management node according to claim 9, wherein the mobility management node is configured to:
receive a request message from one or more of the gateway node and the SACC node of the system, which request message comprises the boundary information.

14. The mobility management node according to claim 9, wherein the mobility management node is configured to:
determine whether the radio terminal is inside or outside the boundary area by comparing the boundary information with the position information.

15. The mobility management node according to claim 9, wherein the mobility management node is configured to operatively provide the mobility information in a message sent to the gateway node.

16. The mobility management node according to claim 9, wherein the mobility management node is configured to operatively:
obtain another boundary information based on the current position information, which the another boundary information indicates another boundary area wherein at least one of another policy or another charging rule is to be applied for the radio terminal.

* * * * *

UNITED STATES PATENT AND TRADEMARK OFFICE
CERTIFICATE OF CORRECTION

PATENT NO. : 9,936,349 B2  
APPLICATION NO. : 15/387765  
DATED : April 3, 2018  
INVENTOR(S) : Qu et al.

Page 1 of 1

It is certified that error appears in the above-identified patent and that said Letters Patent is hereby corrected as shown below:

In Column 1, Line 8, delete "2015," and insert -- 2015, now Pat. No. 9,544,865, --, therefor.

In Column 5, Line 33, delete "It preferred" and insert -- It is preferred --, therefor.

In Column 5, Line 47, delete "It preferred" and insert -- It is preferred --, therefor.

Signed and Sealed this  
Eleventh Day of September, 2018

Andrei Iancu  
*Director of the United States Patent and Trademark Office*